US012738228B2

(12) United States Patent
Lee et al.

(10) Patent No.: US 12,738,228 B2
(45) Date of Patent: Sep. 15, 2026

(54) COMPENSATION CIRCUIT AND DISPLAY DEVICE INCLUDING SAME

(71) Applicant: LG DISPLAY CO., LTD., Seoul (KR)

(72) Inventors: Dong Gun Lee, Paju-si (KR); Bo Yun Jung, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/903,565

(22) Filed: Oct. 1, 2024

(65) Prior Publication Data

US 2025/0118265 A1 Apr. 10, 2025

(30) Foreign Application Priority Data

Oct. 5, 2023 (KR) ........................ 10-2023-0132324

(51) Int. Cl.
*G09G 3/3258* (2016.01)
*G09G 3/20* (2006.01)

(52) U.S. Cl.
CPC ......... *G09G 3/3258* (2013.01); *G09G 3/2092* (2013.01); *G09G 2310/0291* (2013.01); *G09G 2310/08* (2013.01); *G09G 2320/0223* (2013.01); *G09G 2320/0233* (2013.01); *G09G 2320/0276* (2013.01); *G09G 2330/028* (2013.01)

(58) Field of Classification Search
CPC ............... G09G 3/3258; G09G 3/2092; G09G 2310/0291; G09G 2310/08; G09G 2320/0223; G09G 2320/0233; G09G 2320/0276; G09G 2330/028
See application file for complete search history.

(56) References Cited

U.S. PATENT DOCUMENTS

| | | | | |
|---|---|---|---|---|
| 2010/0007680 A1* | 1/2010 | Yu | G09G 5/10 | 327/530 |
| 2014/0339508 A1* | 11/2014 | Hong | G09G 3/3233 | 257/40 |
| 2016/0086542 A1* | 3/2016 | Lee | G09G 3/3225 | 345/212 |
| 2018/0096666 A1* | 4/2018 | Chung | G09G 3/3696 | |
| 2020/0019482 A1* | 1/2020 | Moon | B60K 35/28 | |
| 2021/0043150 A1* | 2/2021 | Lee | G09G 3/3291 | |

(Continued)

FOREIGN PATENT DOCUMENTS

| | | |
|---|---|---|
| KR | 10-2019-0023859 A | 3/2019 |
| KR | 10-2021-0083967 A | 7/2021 |
| KR | 10-2022-0097171 A | 7/2022 |

*Primary Examiner* — Ke Xiao
*Assistant Examiner* — Jennifer L Zubajlo
(74) *Attorney, Agent, or Firm* — Birch, Stewart, Kolasch & Birch, LLP

(57) ABSTRACT

A display device including a display panel including data lines, gate lines, and pixels applied with pixel driving voltages; a data driver configured to supply pixel data to the data lines; a power supply configured to apply the pixel driving voltage to the pixels; and a compensation circuit configured to generate a pixel driving voltage drop amount using a pixel driving voltage applied from the power supply and a pixel driving voltage fed back from a central portion of the display panel, amplify the generated pixel driving voltage drop amount using a predetermined gain value, and generate a compensation voltage value for compensating a gamma reference voltage for a corresponding pixel using the amplified pixel driving voltage drop amount.

21 Claims, 18 Drawing Sheets

(56) References Cited

U.S. PATENT DOCUMENTS

| | | | | |
|---|---|---|---|---|
| 2021/0366343 | A1* | 11/2021 | Oh | G09G 3/2003 |
| 2022/0068184 | A1* | 3/2022 | Oh | G09G 3/3275 |
| 2022/0084479 | A1* | 3/2022 | Kim | G09G 3/3607 |
| 2022/0208043 | A1* | 6/2022 | Park | G09G 3/20 |
| 2022/0301493 | A1* | 9/2022 | Shin | G06F 3/1446 |
| 2024/0136339 | A1* | 4/2024 | Lei | H10D 86/441 |
| 2024/0212576 | A1* | 6/2024 | Lee | G09G 3/2007 |
| 2024/0386837 | A1* | 11/2024 | Li | G09G 3/2096 |
| 2025/0118239 | A1* | 4/2025 | Kwon | G09G 3/2007 |

* cited by examiner

COMPENSATION CIRCUIT AND DISPLAY DEVICE INCLUDING SAME

CROSS-REFERENCE TO RELATED APPLICATION

This application claims priority to Korean Patent Application No. 10-2023-0132324, filed on Oct. 5, 2023, the entire contents of which are hereby expressly incorporated by reference into the present application.

BACKGROUND

Field

The present disclosure relates to a compensation circuit and a display device including the same.

Description of Related Art

Electroluminescent display devices include inorganic and organic light emitting display devices according to a material of a light emitting layer. In more detail, an active-matrix type organic light emitting display device includes an organic light emitting diode (hereinafter referred to as an "OLED") which emits light by itself, and has advantages in that a response speed is fast and luminous efficiency, luminance, and a viewing angle are large.

In organic light-emitting display devices, OLEDs are formed in each pixel. These organic light display devices not only respond quickly and have excellent light-emitting efficiency, luminance, and viewing angle, but the devices also have excellent contrast ratio and color reproduction rate because they can express black tones as a complete black.

In addition, a pixel driving voltage ELVDD is applied to the pixels to drive the pixels to display an image. The pixel driving voltage ELVDD also has a voltage drop depending on a load within a display panel of the display device. The display device can also receive a pixel driving voltage fed back from one end of a display panel to calculate a voltage drop amount using a differential amplifier, and compensate a gamma reference voltage according to the calculated voltage drop amount to compensate for the voltage drop in the pixel driving voltage.

However, display devices with a dual feeding structure have a maximum voltage drop amount at a center of the structure. Thus, when the pixel driving voltage is fed back from the input end of the display panel, a voltage drop caused by a resistor within a drive IC cannot be compensated. In addition, when the voltage drop amount is regulated using a differential amplifier, it is difficult to compensate for differences in brightness because the voltage drop amount can only be regulated by changing a resistance value of the differential amplifier.

SUMMARY

Accordingly, one object of the present disclosure is directed to addressing the above-noted and other problems.

Another object of the present disclosure is to provide a compensation circuit and a display device including the same.

To achieve these and other advantages and in accordance with the purpose of the present invention, as embodied and broadly described herein, the present invention provides in one aspect a compensation circuit including a voltage calculator configured to generate a voltage drop amount of the pixel driving voltage using a pixel driving voltage applied from a power supply and a pixel driving voltage fed back from a central portion of a display panel; and a voltage compensator configured to generate a compensation voltage value for compensating the gamma reference voltage using the generated voltage drop amount and a gamma reference voltage.

In another aspect, the present invention provides a display device including a display panel having plurality of data lines, a plurality of gate lines, and pixels supplied with pixel driving voltages; a data driver configured to supply pixel data to the plurality of data lines; a power supply configured to apply the pixel driving voltage; and a compensation circuit configured to generate a voltage drop amount of the pixel driving voltage using the pixel driving voltage applied from the power supply and the pixel driving voltage fed back from a central portion of the display panel, and to generate a compensation voltage value to compensate for the gamma reference voltage using the generated voltage drop amount and a gamma reference voltage.

In addition, a pixel driving voltage fed back from a central portion of the display panel and a pixel driving voltage applied from a power supply are used to extract a voltage drop amount, and a gamma reference voltage is compensated by applying a gain regulated according to predetermined parameters to the extracted voltage drop amount so that the voltage drop can be compensated by a resistor at an input end of the display panel. Since a gain is applied to the voltage drop amount using a DAC, it is possible to control the gain value according to predetermined parameters such as brightness values and gray levels. In addition, a luminance deviation can be reduced in all gray levels. Because the luminance deviation is reduced in all gray levels, the power consumption can be reduced.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION OF EXEMPLARY EMBODIMENTS

Figure 1:
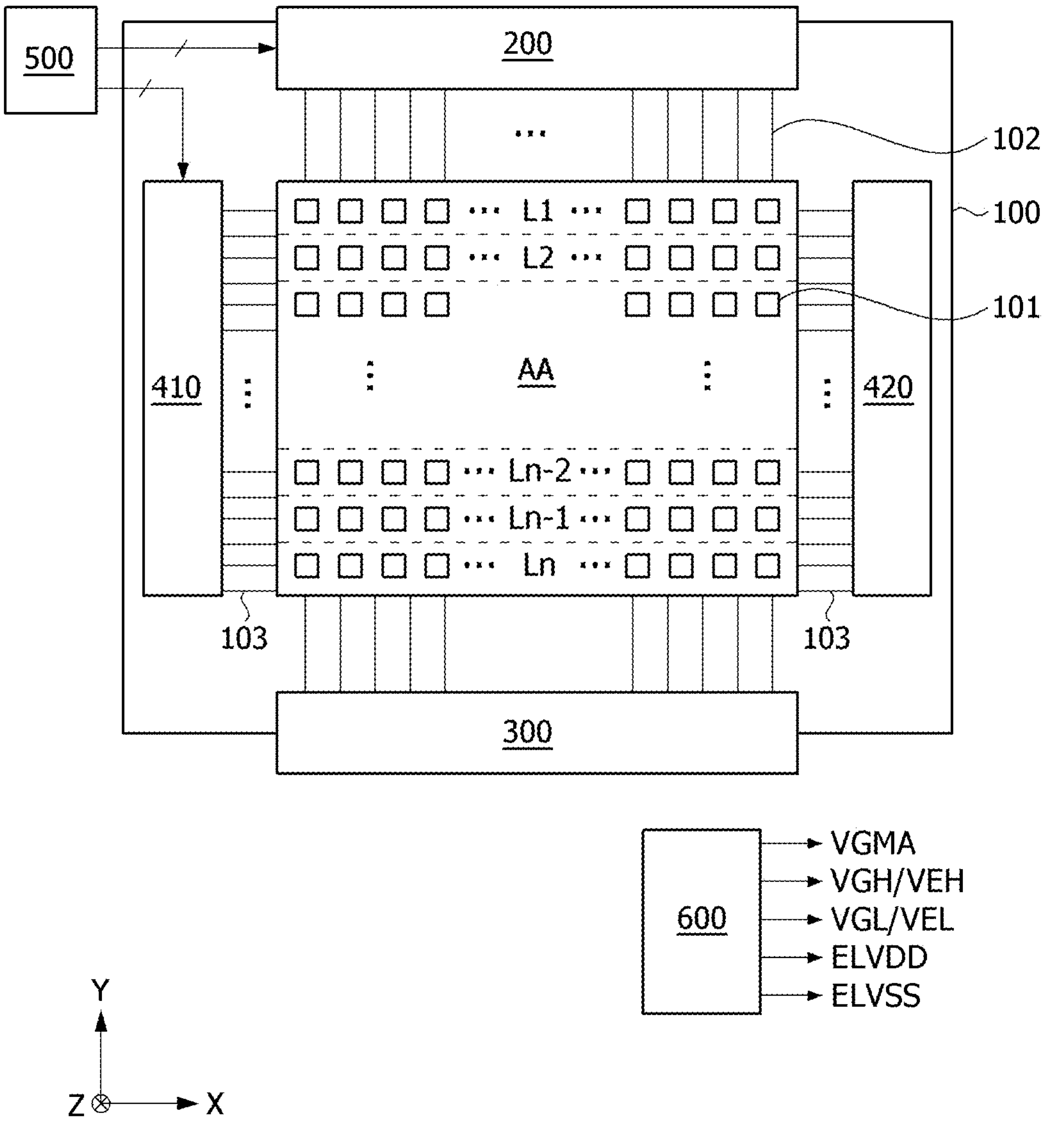
FIG. 1 is a block diagram illustrating a display device according to one embodiment of the present disclosure.

Advantages and features of the present specification and methods of achieving them will become apparent with reference to preferable embodiments, which are described in detail, in conjunction with the accompanying drawings. However, the present specification is not limited to the embodiments to be described below and may be implemented in different forms, the embodiments are only provided to completely disclose the present disclosure and completely convey the scope of the present disclosure to those skilled in the art, and the present specification is defined by the disclosed claims.

Since the shapes, sizes, proportions, angles, numbers, and the like disclosed in the drawings for describing the embodiments of the present disclosure are only exemplary, the present disclosure is not limited to the illustrated items. The same reference numerals indicate the same components throughout the specification.

When 'including,' 'having,' 'consisting,' and the like mentioned in the present specification are used, other parts may be added unless 'only' is used. When a component is expressed in a singular form includes a plural form unless explicitly stated otherwise. In interpreting the components, it should be understood that an error range is included even when there is no separate explicit description.

In a description of a positional relationship, for example, when the positional relationship of two parts is described as 'on,' 'at an upper portion,' 'at a lower portion,' 'next to, and the like, one or more other parts may be located between the two parts unless 'immediately' or 'directly' is used. Although first, second, and the like are used to describe various components, these components are not limited by these terms. These terms are only used to distinguish one component from another. Accordingly, a first component, which is mentioned, below may also be a second component within the technical spirit of the present disclosure. The same reference numerals may refer to substantially the same elements throughout the present disclosure.

The following embodiments can be partially or entirely bonded to or combined with each other and can be linked and operated in technically various ways. The embodiments can be carried out independently of or in association with each other. Hereinafter, various embodiments of the present disclosure will be described in detail with reference to the accompanying drawings.

In a display device of the present disclosure, the pixel circuit and the gate driving circuit include a plurality of transistors. Transistors can be implemented as oxide thin film transistors (oxide TFTs) including an oxide semiconductor, low temperature polysilicon (LTPS) TFTs including low temperature polysilicon, or the like.

In more detail, a transistor is a three-electrode element including a gate, a source, and a drain. The source is an electrode that supplies carriers to the transistor, and the drain is an electrode through which carriers exit from the transistor. Thus, carriers flow from the source to the drain. For an n-channel transistor, because carriers are electrons, a source voltage is lower than a drain voltage such that electrons can flow from the source to the drain. In addition, the n-channel transistor has a direction of a current flowing from the drain to the source. For a p-channel transistor (p-channel metal-oxide semiconductor (PMOS), since carriers are holes, a source voltage is higher than a drain voltage such that holes can flow from the source to the drain. In the p-channel transistor, because holes flow from the source to the drain, a current flows from the source to the drain. In addition, a source and a drain of a transistor are not fixed. For example, a source and a drain can be changed according to an applied voltage. Therefore, the disclosure is not limited due to a source and a drain of a transistor. In the following description, a source and a drain of a transistor will be referred to as a first electrode and a second electrode.

Further, a gate signal swings between a gate-on voltage and a gate-off voltage. The gate-on voltage is set to a voltage higher than a threshold voltage of a transistor, and the gate-off voltage is set to a voltage lower than the threshold voltage of the transistor. Further, the transistor is turned on in response to the gate-on voltage and is turned off in response to the gate-off voltage. For the n-channel transistor, a gate-on voltage can be a gate high voltage, and a gate-off voltage can be a gate low voltage. For the p-channel transistor, a gate-on voltage can be a gate low voltage, and a gate-off voltage can be a gate high voltage.

In an embodiment, a pixel driving voltage fed back from a central portion of the display panel and a pixel driving voltage applied from a power supply are used to extract a voltage drop amount, and a gamma reference voltage is compensated by applying a gain regulated according to a predetermined parameter to the extracted voltage drop amount. Here, the predetermined parameter includes various parameters that affect a voltage drop amount, and include, for example, a brightness value corresponding to a use environment of a display device, and a grayscale value corresponding to a driving environment.

Figure 2:
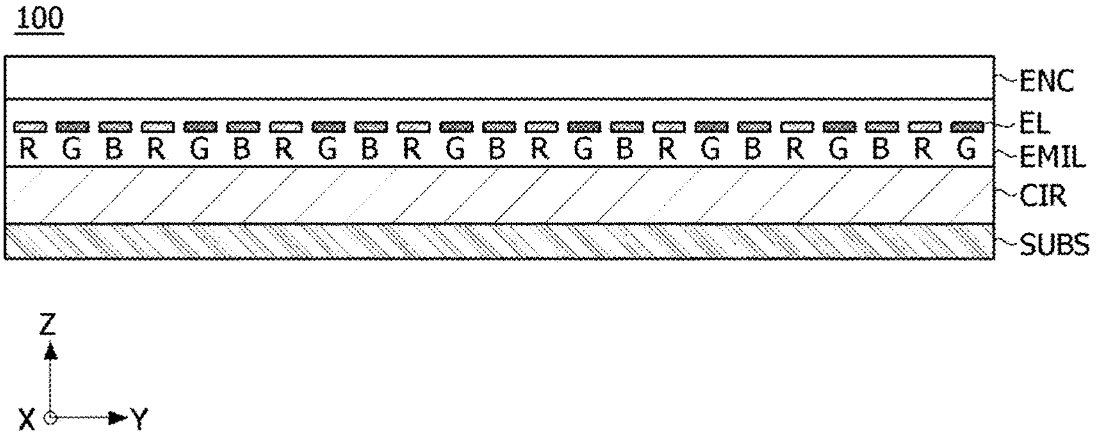
FIG. 2 is a cross-sectional view illustrating a cross-sectional structure of a display panel shown in FIG. 1.

Turning now to FIG. 1 and FIG. 2, which is a block diagram illustrating a display device according to an embodiment of the present disclosure, and FIG. 2, which is a diagram illustrating a cross-sectional structure of a display panel shown in FIG. 1. Referring to FIGS. 1 and 2, a display device includes a display panel 100, a display panel driving unit configured to write pixel data to pixels of the display panel 100, and a power supply unit 600 configured to generate power required for driving the pixels and the display panel driving unit.

In addition, the display panel 100 can be a rectangular-shaped structure having a length in an X-axis direction, a width in a Y-axis direction, and a thickness in a Z-axis direction. A display area AA of the display panel 100 includes a pixel array that displays an input image. Further, the pixel array includes a plurality of data lines 102, a plurality of gate lines 103 intersecting the data lines 102, and pixels disposed in a matrix form. The display panel 100 can further include power lines commonly connected to the pixels. That is, the power lines can be commonly connected to pixel circuits and can supply voltages required for driving pixels 101 to the pixels 101.

Also, each pixel 101 can be divided into a red sub-pixel, a green sub-pixel, and a blue sub-pixel for color implementation. Each pixel can further include a white sub-pixel. Further, each sub-pixel includes a pixel circuit for driving a light-emitting element, in which each pixel circuit is connected to the data lines, the gate lines, and the power lines.

In addition, as shown in FIG. 1, the pixel array includes a plurality of pixel lines L1 to Ln. As shown, each of the pixel lines L1 to Ln includes one line of pixels disposed in a line direction or a length direction (the X-axis direction) of display panel in the pixel array of the display panel 100.

Further, the display panel 100 can be implemented as a non-transmissive display panel or a transmissive display panel. In more detail, the transmissive display panel is applicable to a transparent display device in which an image is displayed on a screen and a real background object is visible. The display panel can also be manufactured as a flexible display panel.

In addition, as shown in FIG. 2, the cross-sectional structure of the display panel 100 can include a circuit layer CIR, a light-emitting element layer EMIL, and an encapsulation layer ENC stacked on a substrate SUBS. The circuit layer CIR can include a thin-film transistor (TFT) array including a pixel circuit connected to wirings such as a data line, a gate line, a power line, and the like, and a gate driver 410 and 420 (FIG. 1). Further, the circuit layer CIR includes a plurality of metal layers insulated with insulating layers interposed therebetween, and a semiconductor material layer. All transistors formed in the circuit layer CIR can be implemented as n-channel oxide TFTs.

In addition, the light-emitting element layer EMIL can include a light-emitting element driven by the pixel circuit. In more detail, the light-emitting element can include a light-emitting element of a red sub-pixel, a light-emitting element of a green sub-pixel, and a light-emitting element of a blue sub-pixel. Also, the light-emitting element layer EMIL can further include a light-emitting element of white sub-pixel. The light-emitting element layer EMIL corresponding to each sub-pixel can have a structure in which a light-emitting element and a color filter are stacked. The light-emitting elements EL in the light-emitting element layer EMIL can also be covered by multiple protective layers including an organic film and an inorganic film.

Further, the encapsulation layer ENC covers the light-emitting element layer EMIL to seal the circuit layer CIR and the light-emitting element layer EMIL. The encapsulation layer ENC can also have a multi-insulating film structure in which an organic film and an inorganic film are alternately stacked. In addition, the inorganic film blocks permeation of moisture and oxygen, and the organic film planarizes the surface of the inorganic film. When the organic film and the inorganic film are stacked in multiple layers, the movement path of moisture and oxygen becomes longer than that of a single layer, so that penetration of moisture and oxygen affecting the light-emitting element layer EMIL can be effectively blocked.

In addition, a touch sensor layer can be formed on the encapsulation layer ENC, and a polarizing plate or a color filter layer can be disposed thereon. The touch sensor layer can include capacitive touch sensors that sense a touch input based on a change in capacitance before and after the touch input. Also, the touch sensor layer can have metal wiring patterns and insulating films that form the capacitance of the touch sensors. In particular, the insulating films can insulate an area where the metal wiring patterns intersect and can planarize the surface of the touch sensor layer. Further, the polarizing plate can improve visibility and contrast ratio by converting the polarization of external light reflected by metal in the touch sensor layer and the circuit layer. The polarizing plate can be implemented as a circular polarizing plate or a polarizing plate in which a linear polarizing plate and a phase retardation film are bonded together. In addition, a cover glass can be adhered to the polarizing plate, and the color filter layer can include red, green, and blue color filters. The color filter layer can further include a black matrix pattern and can replace the polarizing plate by absorbing a part of the wavelength of light reflected from the circuit layer and the touch sensor layer, and increase the color purity of an image reproduced in the pixel array.

Further, the power supply unit 600 generates direct current (DC) power used to drive the display panel driving unit and the pixel array of the display panel 100 by using a DC-DC converter. In more detail, the DC-DC converter can include a charge pump, a regulator, a buck converter, a boost converter, and the like. The power supply unit 600 can also adjust a level of an input DC voltage applied from a host system to generate constant voltages (or DC voltages) such as a gamma reference voltage VGMA, gate-on voltages VGH and VEH, gate-off voltages VGL and VEL, the pixel driving voltage ELVDD, the low-potential power voltage ELVSS, the initialization voltage Vinit, and the reference voltage Vref. Further, the gamma reference voltage VGMA is supplied to a data driver 200, and the gate-on voltages VGH and VEH and the gate-off voltages VGL and VEL are supplied to a gate driver 120. Also, the constant voltages such as the pixel driving voltage ELVDD, the low-potential power voltage ELVSS, the initialization voltage Vinit, and the reference voltage Vref are commonly supplied to the pixels.

Further, the display panel driving unit writes pixel data of an input image to the pixels of the display panel 100 under control of a timing controller (TCON) 500. The display panel driving unit includes the data drivers 200 and 300 and the gate drivers 410 and 420. The display panel driving unit also includes the timing controller (TCON) 500 that controls the data drivers 200 and 300 and the gate driver 410 and 420.

In addition, the display panel driving unit may further include a touch sensor driver for driving the touch sensors. The data drivers 200 and 300 and the touch sensor driver can be integrated into one drive integrated circuit (IC).

Figure 3:
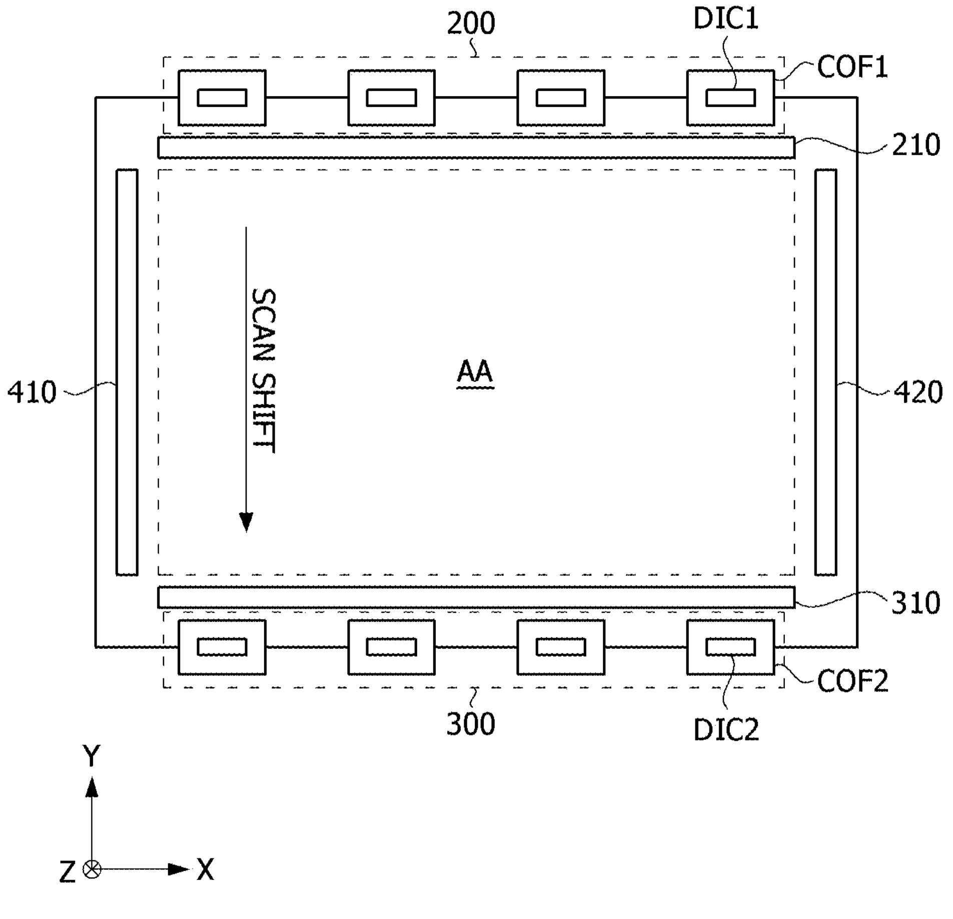
FIG. 3 is a diagram illustrating drive ICs arranged at the top and bottom of a display panel.

Further, as shown in FIGS. 1 and 3, the data drivers 200 and 300 include a first data driver 200 disposed at the top of the display panel 100 and a second data driver 300 disposed at the bottom of the display panel 100. Each of the first and second data drivers 200, 300 can be implemented as one or more drive ICs (DIC1, DIC2) as shown in FIG. 3.

Also, each of the first and second data drivers 200 and 300 receives pixel data of the input image received as a digital signal from the timing controller 500 and outputs a data voltage. Each of the first and second data drivers 200 and 300 also outputs a data voltage by converting pixel data of the input image with a gamma compensation voltage by using a digital to analog converter (DAC). Further, the gamma reference voltage is divided into a gamma compensation voltage for each gray level through a voltage divider circuit. In particular, the gamma compensation voltage for each gray level is provided to the DAC of the data drivers 200 and 300, and the data voltage is output through the output buffer AMP in each of the channels of the data drivers 200 and 300.

In addition, gate drivers 410 and 420 include a first gate driver 410 disposed on the left side of the display panel 100 and a second gate driver 420 disposed on the right side of the display panel 100. The gate drivers 410 and 420 can also be implemented as a gate in panel (GIP) circuit formed in the circuit layer (CIR) on the display panel 100 along with the TFT array and wires of the pixel array. Further, the gate drivers 410 and 420 are disposed on the bezel area (BZ), which is a non-display area of the display panel 100, or at least some of the circuit elements of the gate drivers 410 and 420 are disposed in the display area AA.

In addition, the gate drivers 410 and 420 can supply pulses of the gate signal to both sides of the gate lines 103 using a double feeding method. For example, the first gate driver 410 and the second gate driver 420 can simultaneously apply pulses of gate signal to both sides of each gate line under the control of the timing controller 500. The gate drivers 410 and 420 can also supply pulses of the gate signal to one side of the gate lines 103 using a single feeding method. For example, the first gate driver 410 can apply pulses of gate signal to one side of odd gate lines 103 under the control of the timing controller 500, and the second gate driver 420 can apply pulses of gate signal to the other side of even gate lines 103 under the control of the timing controller 500. The gate drivers 410 and 420 can also sequentially supply the gate signals to the gate lines 103 by shifting the gate signals using a shift register. The gate driver 410 and 420 may include a plurality of shift registers.

In addition, the timing controller 500 receives digital video data DATA of an input image and timing signals synchronized with the digital video data from the host system. The timing signals can include a vertical synchronization signal Vsync, a horizontal synchronization signal Hsync, a clock CLK, a data enable signal DE, and the like. Also, the vertical synchronization signal Vsync and the horizontal synchronization signal Hsync may be omitted when a vertical period and a horizontal period are obtained by a method of counting the data enable signal DE. The data enable signal DE has a period of one horizontal period 1H.

In addition, the host system can be one of a television system, a tablet computer, a notebook computer, a personal computer (PC), a home theater system, and a vehicle system. The host system can also scale an image signal from a video source to match a resolution of the display panel 100 and transmit a resultant image signal and a timing signal to the timing controller 500.

Further, the timing controller 500 transmits pixel data of an input image to the data drivers 200 and 300. Based on the timing signals Vsync, Hsync, and DE received from the host system, the timing controller 500 generates a data timing control signal for controlling the operation timing of the data drivers 200 and 300, and a gate timing control signal for controlling the operation timing of the gate drivers 410 and 420. The timing controller 500 also synchronizes the data driver 200 and 300 and the gate drivers 410 and 420 by controlling the operation timings of the display panel driving circuit.

In addition, the gate timing control signal output from the timing controller 500 can be input to the gate drivers 410 and 420 through a level shifter (not shown). The level shifter can also receive the gate timing control signal, generate a start signal and a shift clock, and supply them to the gate driver 410 and 420.

Next, FIG. 3 is a diagram illustrating drive ICs arranged at the top and bottom of a display panel. Referring to FIG. 3, the first data driver 200 can include a plurality of first chip on films COFs (COF1) on which the first drive IC (DIC1) is mounted. As shown, the output pads of the first COFs (COF1) are attached to the top of the display panel through an anisotropic conductive film (ACF).

In addition, the second data driver 300 can include a plurality of second COFs (COF2) on which the second drive IC (DIC2) is mounted. As shown, the output pads of the second COFs (COF2) are attached to the bottom of the display panel through an anisotropic conductive film (ACF). In FIG. 3, "SCAN SHIFT" indicates a scan shift direction in which pixel lines on which pixel data is written are sequentially selected one line at a time by sequentially shifting the pulses of the gate signal.

Figure 4:
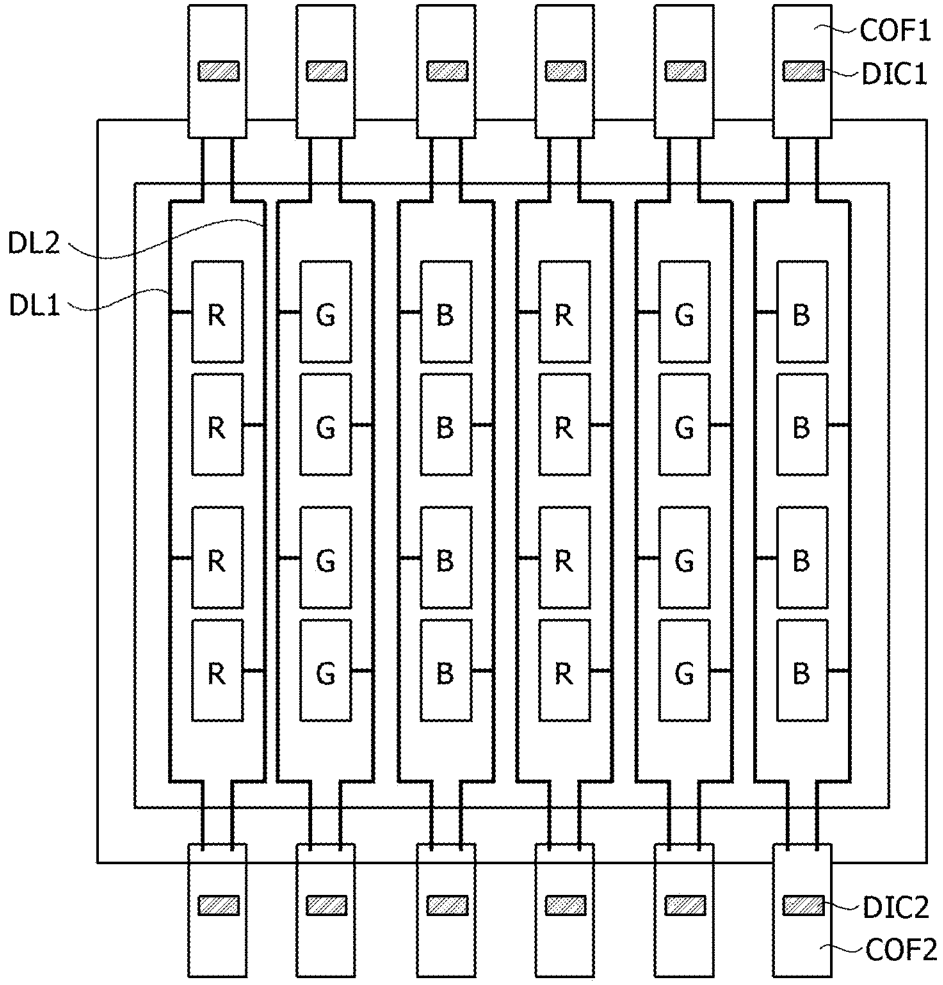
FIG. 4 is a diagram illustrating in detail a connection relationship between demultiplexers and pixels.

Next, FIG. 4 is a diagram illustrating in detail a connection relationship between data lines and pixels. In FIG. 4, neighboring Rs are red sub-pixels arranged in the same column line in neighboring pixel lines, neighboring Gs are green sub-pixels arranged on the same column line in neighboring pixel lines, and neighboring Bs are blue sub-pixels arranged on the same column line in neighboring pixel lines.

Referring to FIG. 4, the first drive IC (DIC1) can be disposed to the top of the display panel, and the second drive IC (DIC2) can be disposed to the bottom of the display panel. In the first drive IC DIC1 and the second drive IC DIC2, a pair of data lines DL1 and DL2 can be connected to each other for each column line.

In addition, the pixel lines and column lines are crossed. In particular, the pixel line includes pixels arranged along a first axis direction X, and the column line includes pixels arranged along a second axis direction Y perpendicular to the first axis direction X. The pixels R, G and B arranged on the odd-numbered pixel line can be connected to an odd-numbered data line DL_O, and the subpixels R, G and B arranged on an even-numbered line can be connected to an even-numbered data line DL E.

Figure 5:
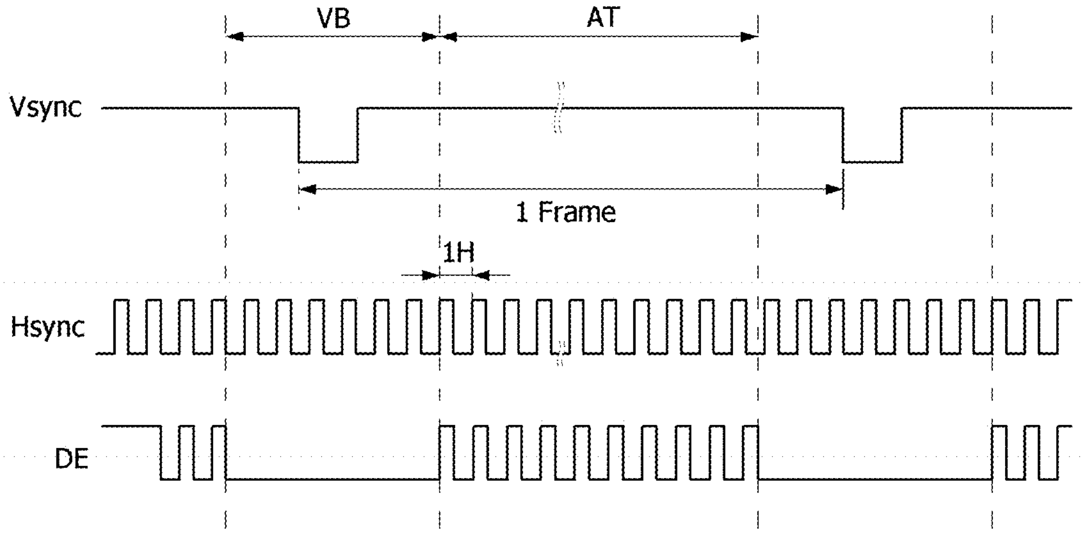
FIG. 5 is a diagram illustrating 1 frame period and 1 horizontal period.

Next, FIG. 5 is a diagram illustrating 1 frame period and 1 horizontal period. As shown in FIG. 5, the vertical synchronization signal Vsync, the horizontal synchronization signal Hsync, and the data enable signal DE are timing signals synchronized with the pixel data of the input image.

In addition, the vertical synchronization signal Vsync defines 1 frame period, and the horizontal synchronization signal Hsync defines 1 horizontal period 1H. Also, the data enable signal DE defines an effective data section including pixel data to be written to the pixels. A pulse of the data enable signal DE is synchronized with the pixel data to be written to the pixels of the display panel 100. 1 pulse period of the data enable signal DE is 1 horizontal period 1H.

In addition, 1 frame period is divided into an active interval AT in which the pixel data of the input image is written to the pixels, and a vertical blank period VB having no pixel data. The vertical blank period VB is a blank period in which pixel data is not received by the timing controller 130 between the active interval AT of M−1 frame period (M is a natural number) and the active interval AT of M frame period. Also, the active interval AT includes pixel data to be written in subpixels of all pixel lines L1 to Ln of the display panel.

Figure 6:
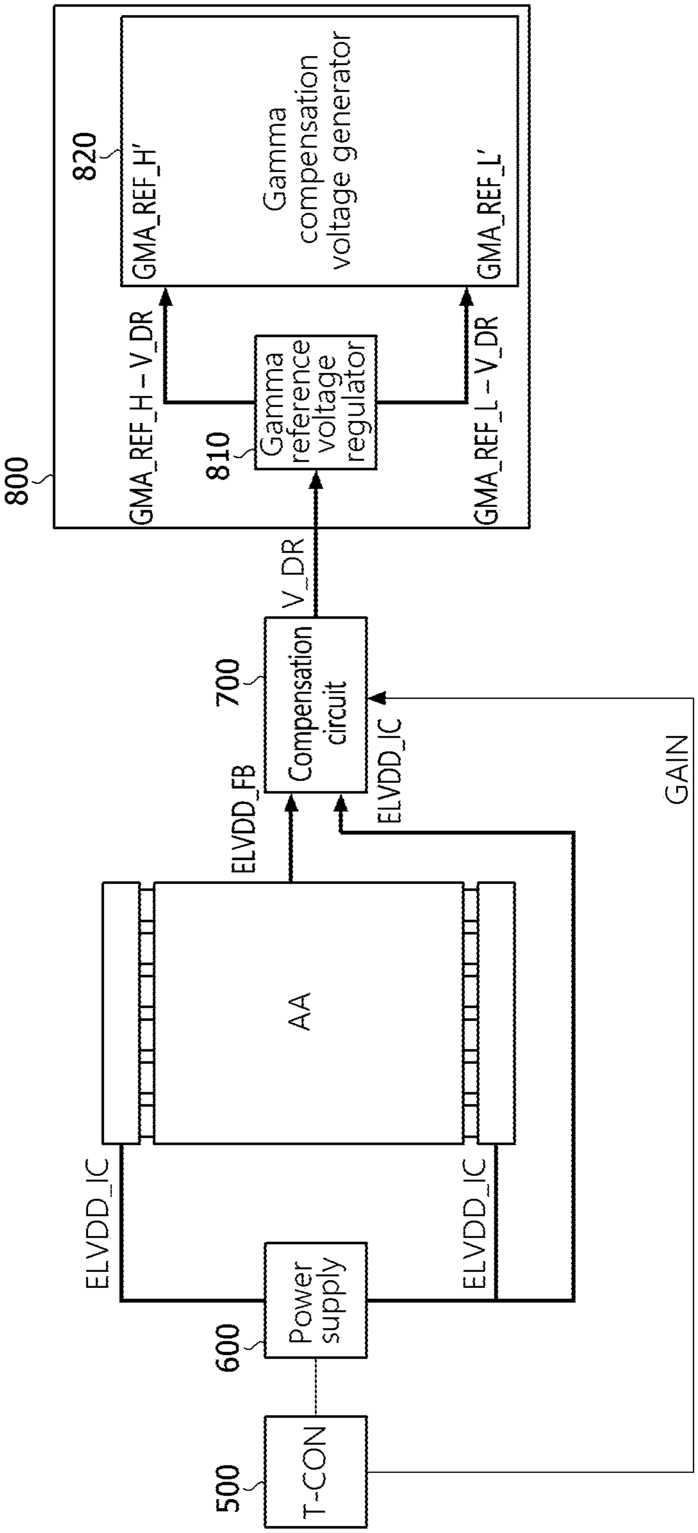
FIG. 6 is a diagram illustrating the operation of a compensation circuit according to an embodiment of the present disclosure.
Figure 7:
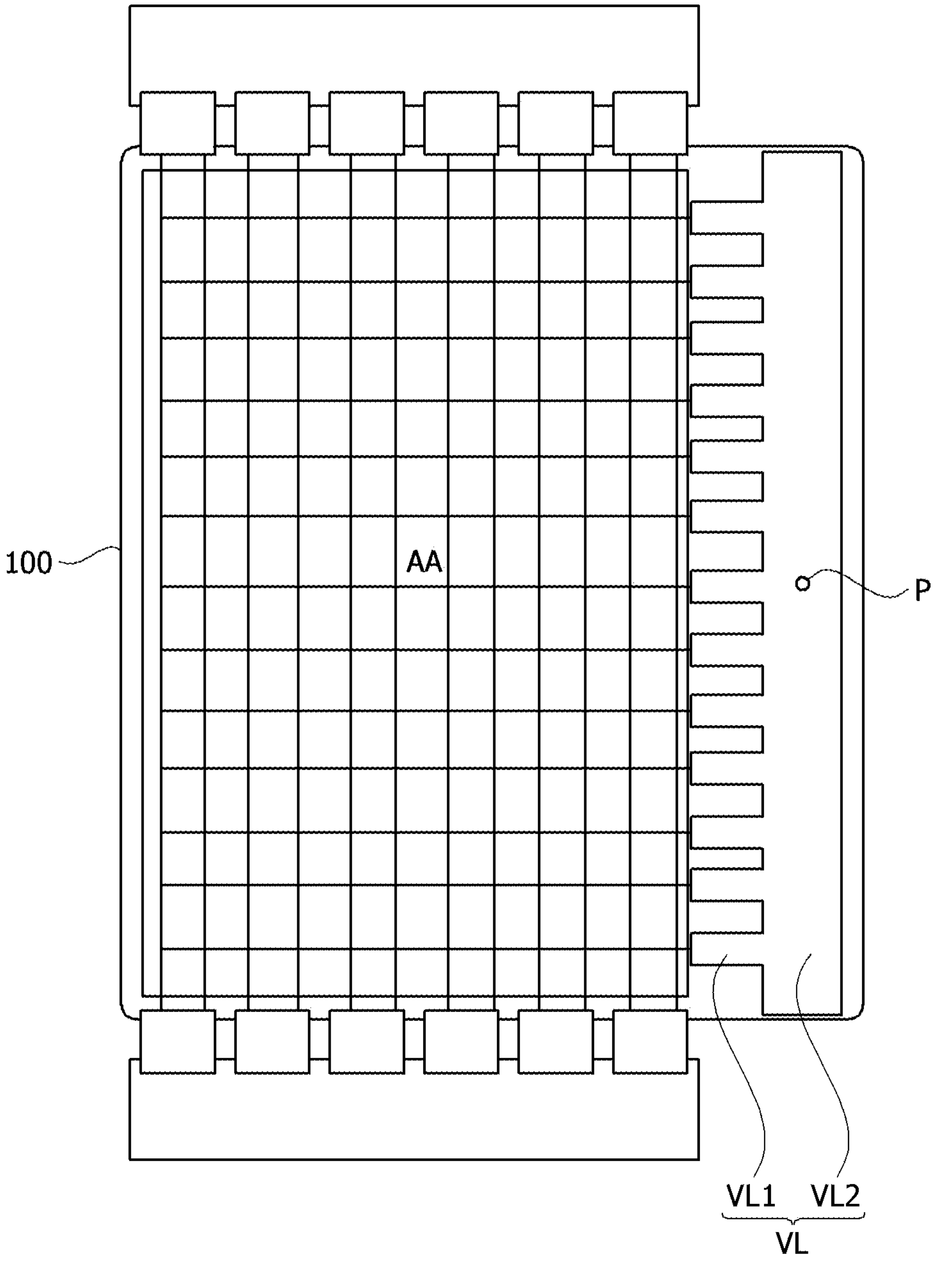
FIG. 7 is a diagram illustrating a voltage wire according to an embodiment of the present disclosure.

Next, FIG. 6 is a diagram illustrating the operation of a compensation circuit 700 and FIG. 7 is a diagram illustrating a voltage wire according to an embodiment of the present disclosure. Referring to FIG. 6, the compensation circuit 700 calculates a first voltage drop amount using a pixel driving voltage supplied from a power supply 600 and a pixel driving voltage fed back from a central portion of the display panel 100, and applies a predetermined gain value according to the brightness value (DBV) or the grayscale value to the calculated voltage drop amount to calculate a second voltage drop amount, which is then supplied to a gamma voltage generator 800.

The gamma voltage generator 800 can then adjust the gamma reference voltage using the calculated second voltage drop amount and generate a gamma voltage for each gray level using the adjusted gamma reference voltage. As shown in FIG. 6, the gamma voltage generator 800 can include a gamma reference voltage regulator 810 and a gamma compensation voltage generator 820. In more detail, the gamma reference voltage regulator 810 can use the calculated second voltage drop amount to adjust the gamma reference voltage, i.e., a high potential gamma reference voltage and a low potential gamma reference voltage, respectively. The gamma compensation voltage generator 820 can also generate a gamma compensation voltage for each gray level using the adjusted high potential gamma reference voltage and low potential gamma reference voltage.

In an embodiment, it is possible to apply a gain value for calculating the second voltage drop amount to compensate for a voltage drop in the display panel 100 by a resistor in the input end of the display panel 100. In addition, it is possible to regulate the gain value according to a predetermined parameter, such as a brightness value or a grayscale value, to compensate for a deviation in the voltage drop. Here, the gain value is described as an example of when it is provided from a timing controller 500, but is not limited thereto and can be provided from a host system.

Referring to FIG. 7, when the display panel has a longer length in the second axis direction than the length in the first axis direction, the voltage drop of the pixel driving voltage is much larger, and thus a voltage wire VL for applying the pixel driving voltage can be formed side by side in the second axis direction of the display panel. As shown, the voltage wire VL can include a first voltage wire VL1 and a second voltage wire VL2. In particular, the first voltage wire VL1 can be formed side by side with the display panel along the second axis direction of the display panel, and the second voltage wire VL2 can be branched from the first voltage wire VL1 and formed side by side with the display panel along the first axis direction. In this instance, the pixel driving voltage is fed back from a central portion P of the first voltage wire VL1.

Although the voltage wire VL is illustrated as an example in which the voltage wire VL is directly formed in a side bezel area of the display panel, it is not limited thereto. For example, the voltage wire VL can be formed on a flexible printed circuit FPC and attached to a side surface of the display panel.

Figure 8A:
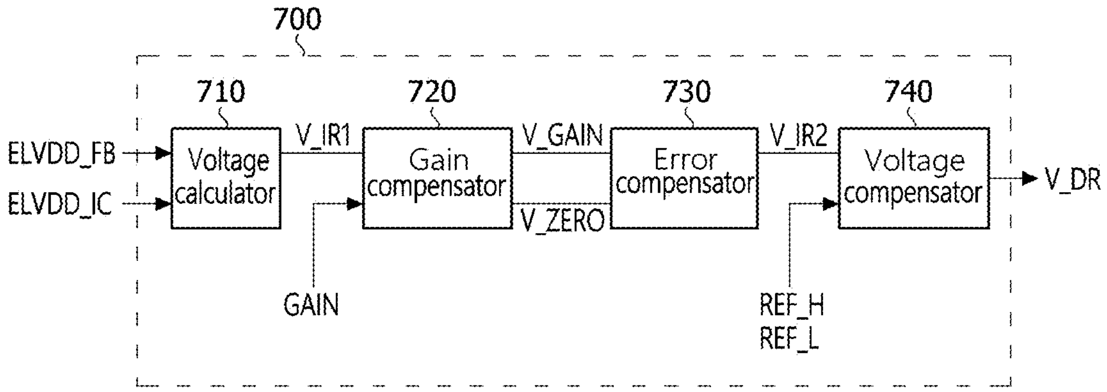
FIGS. 8A and 8B are diagrams illustrating a detailed configuration of a compensation circuit according to an embodiment of the present disclosure.
Figure 8B:
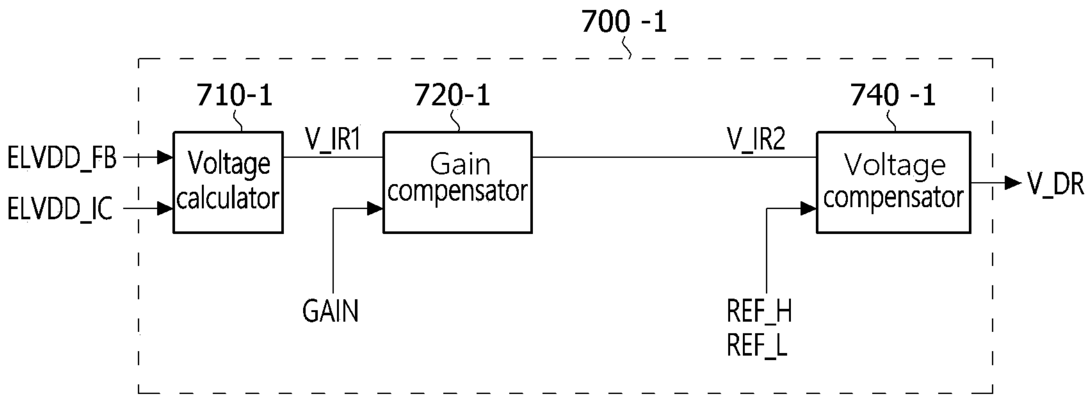
Figure 9A:
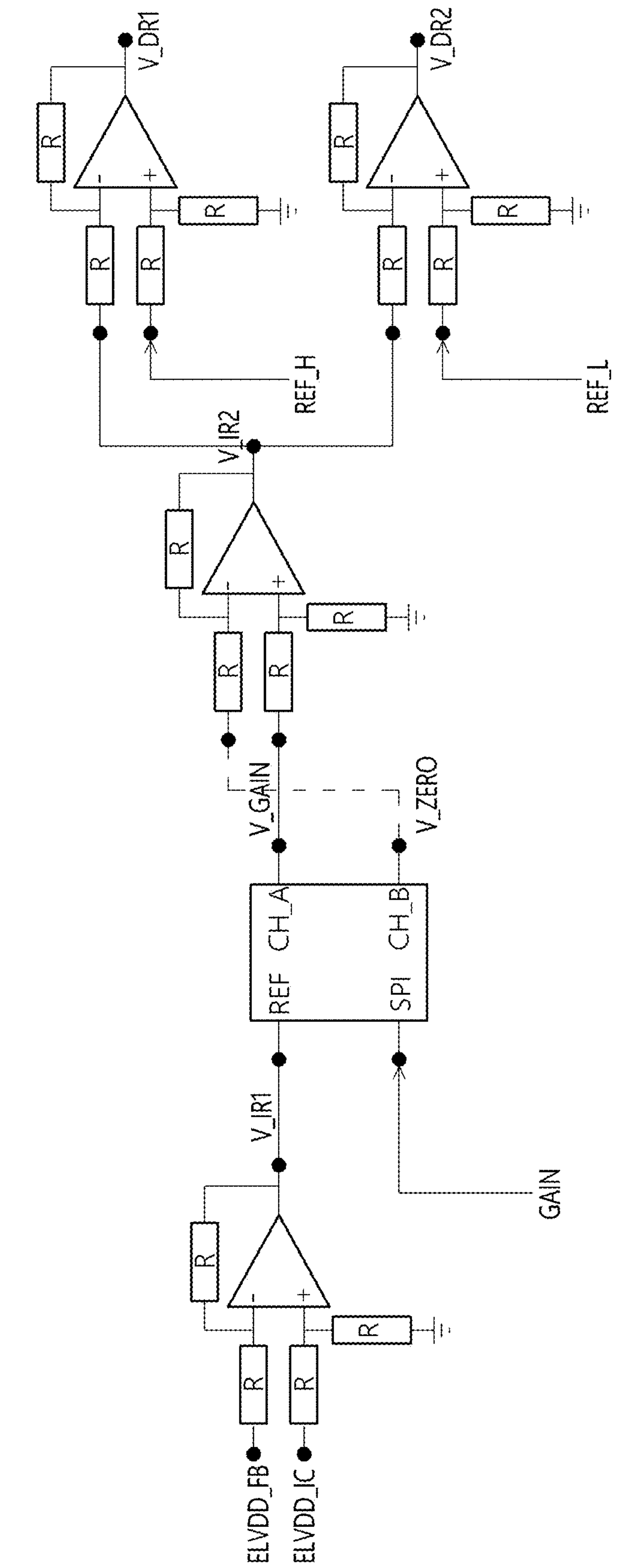
FIGS. 9A and 9B are diagrams illustrating examples of implementing a compensation circuit according to an embodiment of the present disclosure.
Figure 9B:
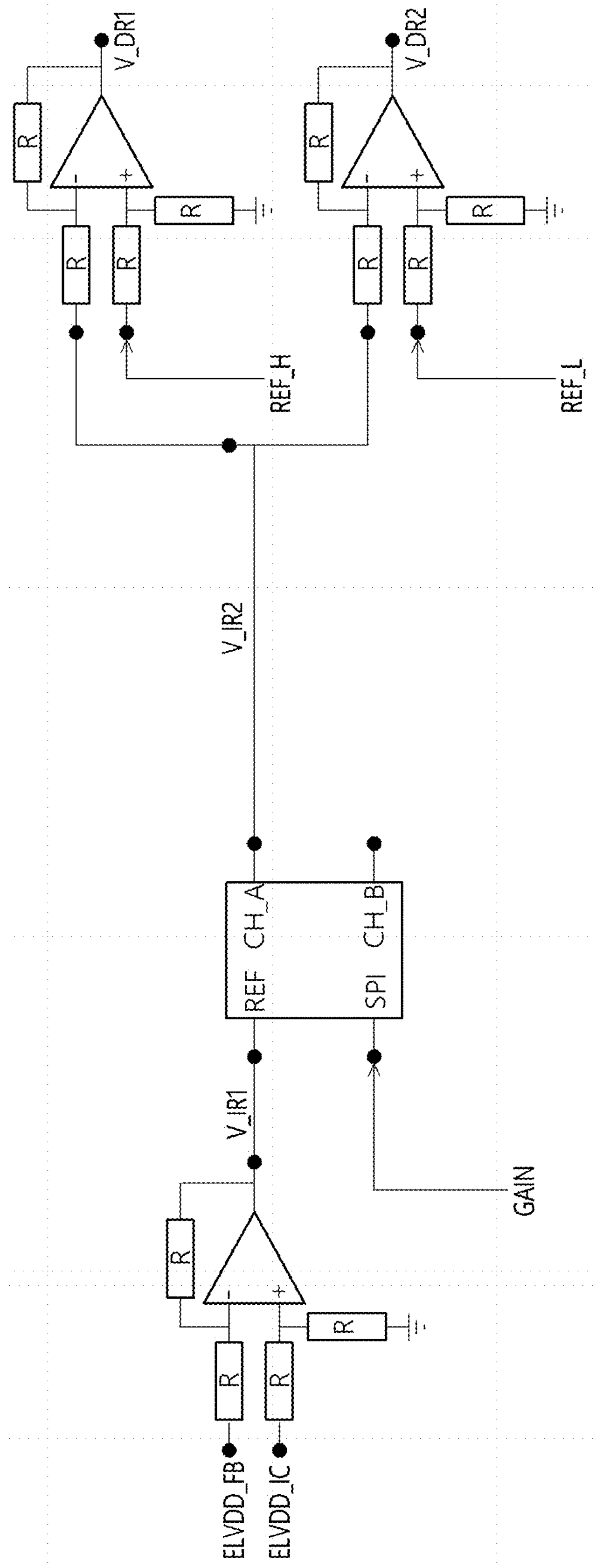

Next, FIGS. 8A and 8B are diagrams illustrating a detailed configuration of a compensation circuit, and FIGS. 9A and 9B are diagrams illustrating examples of implementing a compensation circuit according to an embodiment of the present disclosure. Referring to FIGS. 8A and 9A, the compensation circuit 700 can include a voltage calculator 710, a gain compensator 720, an error compensator 730, and a voltage compensator 740. In more detail, the voltage calculator 710 can receive a pixel driving voltage ELVDD_IC applied from the power supply 600 and a pixel driving voltage ELVDD_FB fed back from the central portion of the display panel 100 to generate a first voltage drop amount V_IR1 of the pixel driving voltage applied to the display panel.

Figure 10:
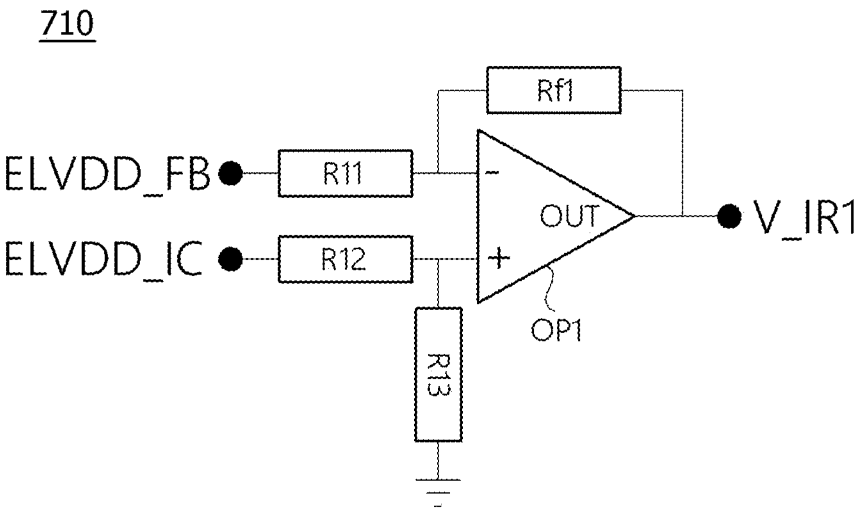
FIG. 10 is a diagram illustrating a configuration of a voltage calculator shown in FIGS. 9A and 9B.

FIG. 10 is a diagram illustrating a configuration of a voltage calculator 710 shown in FIG. 8A (see also FIG. 9A). Referring to FIG. 10, the voltage calculator 710 according to the embodiment can be implemented as a first differential amplifier including an operational amplifier OP1, a first resistor R11 connected to an inverting input terminal (−) of the operational amplifier and to which a pixel driving voltage fed back is applied, a second resistor R12 connected to a non-inverting input terminal (+) of the operational amplifier and to which a pixel driving voltage applied from the power supply is input, a third resistor R13 connected between the non-inverting input terminal (+) and a ground, and a feedback resistor Rf1 connected between an output terminal OUT and the inverting input terminal (−) of the operational amplifier. In addition, the first voltage drop amount V_IR1, which is the output voltage of the first differential amplifier, is expressed by Equation 1 below.

$$\text{V\_IR1} = \frac{R_{f1}}{R_{11}} \times \text{ELVDD\_FB} + \left[1 + \frac{R_{f1}}{R_{11}}\right]\left[\frac{R_{1s}}{R_{12} + R_{13}}\right] \times \text{ELVDD\_IC} \quad \text{(Equation 1)}$$

Further, the gain compensator 720 can receive the first voltage drop amount V_IR1 calculated from the voltage calculator 710 and the gain value GAIN provided by the timing controller to generate a first voltage value V_GAIN and a second voltage value V_ZERO.

Figure 11:
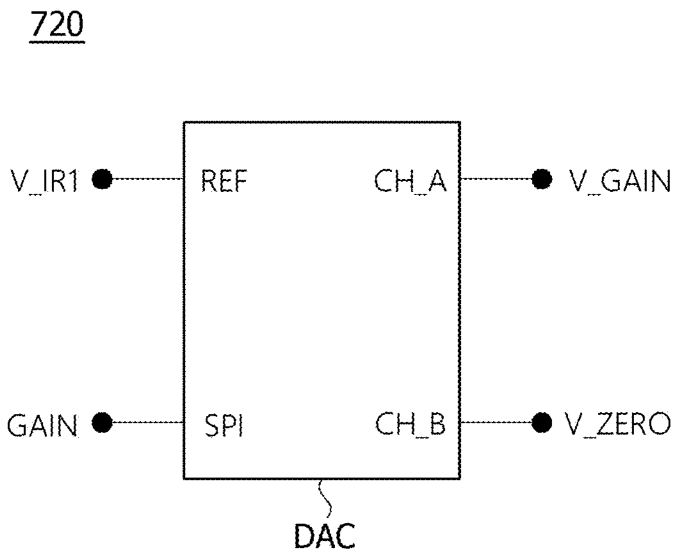
FIG. 11 is a diagram illustrating a configuration of a gain compensator shown in FIGS. 9A and 9B.

FIG. 11 is a diagram illustrating a configuration of a gain compensator 720 shown in FIG. 8A (see also FIG. 9A). Referring to FIG. 11, the gain compensator 720 according to the embodiment can be implemented as a digital analog converter (DAC) module. as shown, the DAC module can include a first input terminal REF receiving the first voltage drop amount V_IR1, a second input terminal SPI receiving a gain value GAIN, a first output terminal CH_A outputting a first voltage value, and a second output terminal CH_B outputting a second voltage value. This DAC module can use a gain to amplify the input voltage by a voltage of more than two times and output the amplified voltage. In this instance, a first voltage value V_GAIN, which is an output voltage of the DAC module, is expressed by Equation 2 below.

$$V_{GAIN} = 2 \times \text{V\_IR1} \times \text{GAIN} \quad \text{(Equation 2)}$$

Further, a second voltage value V_ZERO, which is an output voltage of the DAC module, can be an offset to the output value. For example, if the input of the DAC module is zero, the output should also be zero, but due to the nature of DAC modules, there is a zero-scale-error that allows the output to exist even if the input is zero. This causes the outputs of the DAC module to be added by an offset equal to the zero-scale error. Accordingly, the embodiment compensates for the first voltage value V_GAIN output by using an offset to the output value when the input value is 0. A reason for applying a gain value by the DAC module is explained in more detail below.

Figure 12A:
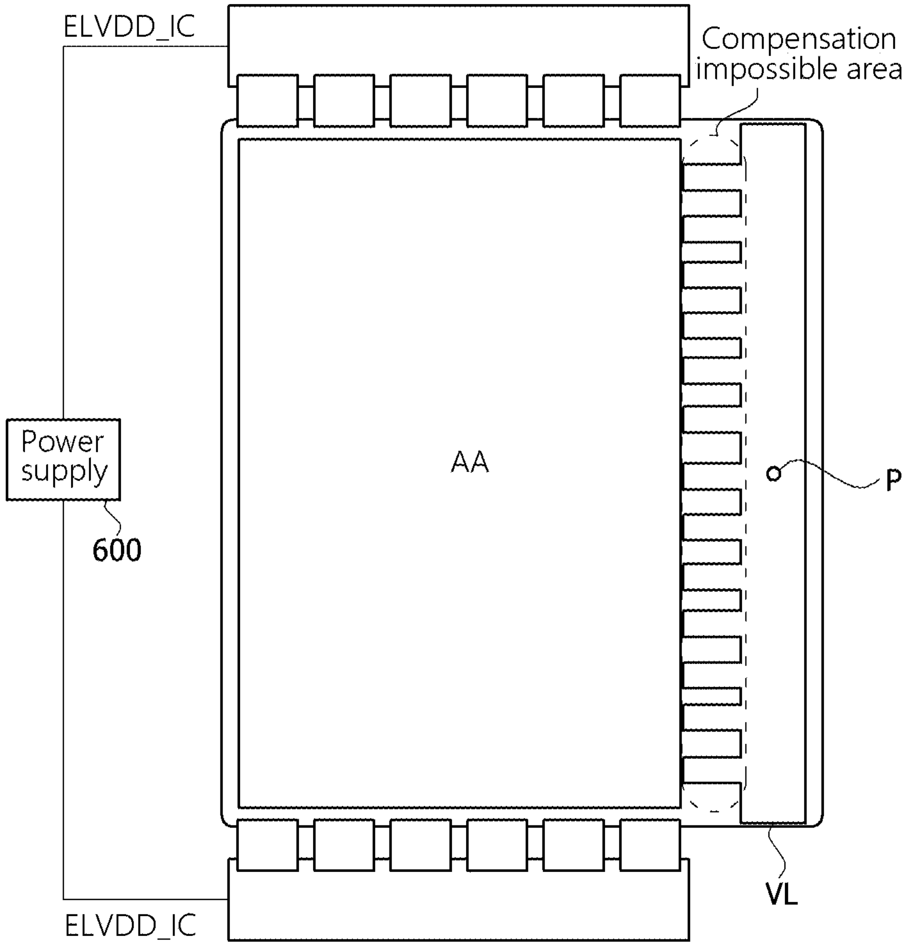
FIGS. 12A to 12D are diagrams illustrating a reason for applying a gain.
Figure 12B:
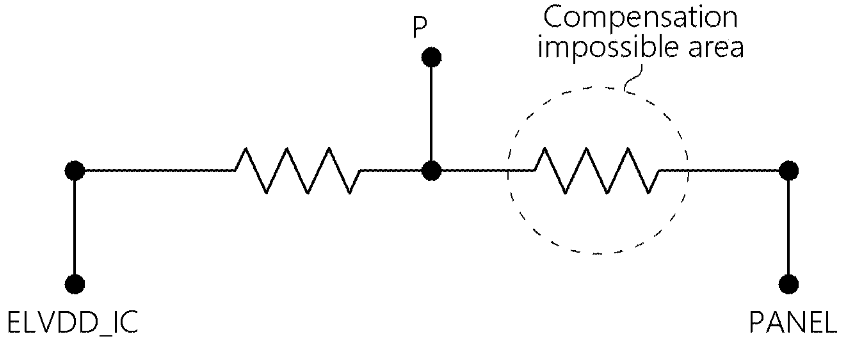

FIGS. 12A to 12D are diagrams illustrating a reason for applying a gain. Referring to FIGS. 12A and 12B, for a double feeding structure, the voltage wire to which the pixel driving voltage is applied can be formed in a vertical direction at an outer portion other than an active area, and the pixel driving voltage can be supplied to the pixel line through several horizontal voltage wire.

For a double feeding structure, the pixel driving voltage and gamma compensation voltage are supplied to the display panel by one IC through PCBs disposed at both ends of the display panel. Therefore, the voltage at both ends can be matched by one IC by receiving the pixel driving voltage fed back from the central portion of the display panel at the same distance from the PCBs at both ends.

However, because a position where the pixel driving voltage is fed back can be positioned on the vertical line, it does not reflect a voltage drop amount caused by the horizontal line and cannot compensate for the voltage drop amount in that portion. Therefore, the embodiment enables compensation for the uncompensated portion by applying a predetermined gain value to a first voltage drop amount.

Figure 12C:
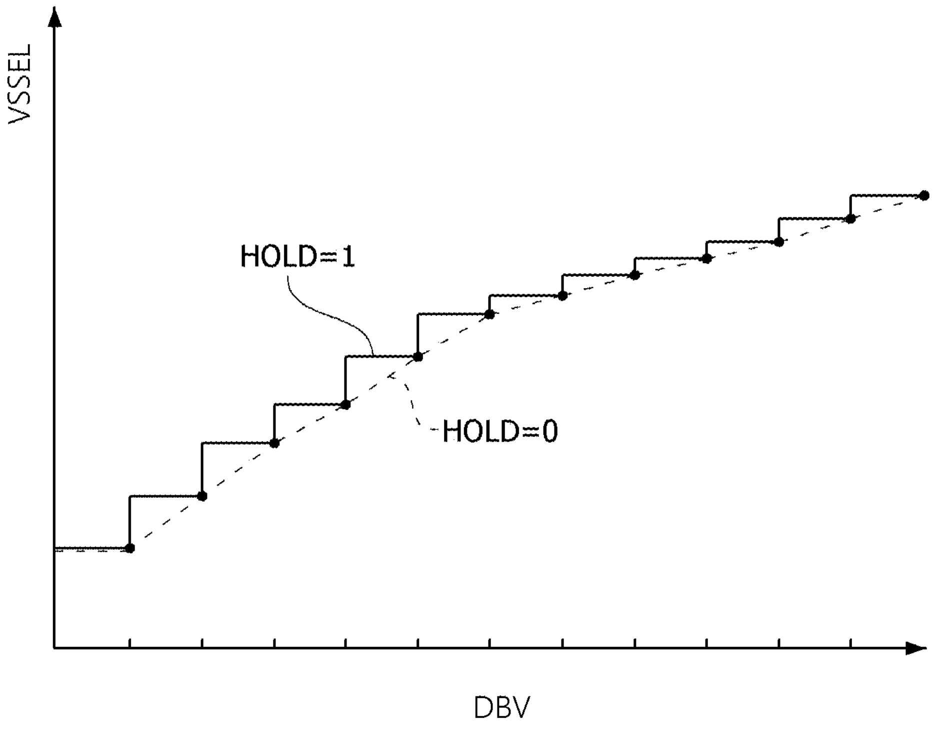
Figure 12D:
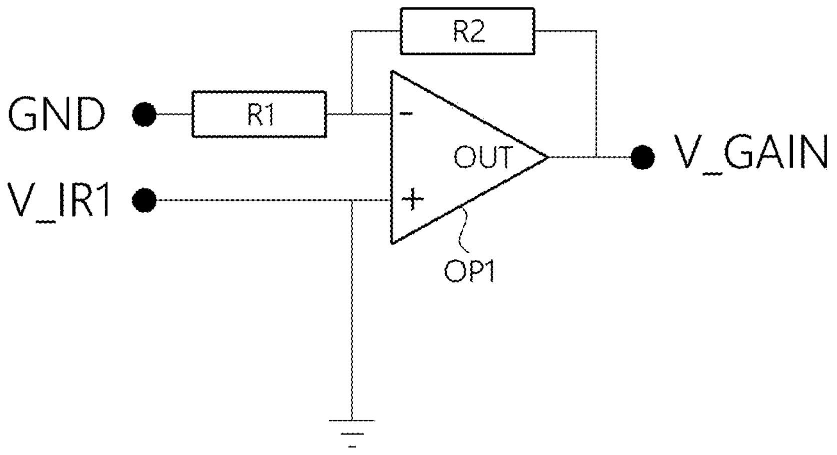

FIGS. 12C and 12D illustrate the ELVSS voltage is changed depending on the brightness value DBV of the pixel data. Here, HOLD=1 shows the ELVSS voltage according to the brightness value, and HOLD=0 shows the result of interpolating HOLD=1. Depending on the brightness value, not only the ELVSS voltage but also other DC voltages can be varied, which in turn can vary the voltage drop amount within the display panel. Therefore, the gain value applied to the first voltage drop amount is also be varied depending on the brightness value. When a differential amplifier is used as shown in FIG. 12D, the output voltage is expressed by Equation 3 below.

$$V_{GAIN} = GAIN \times \text{V\_IR1} = \left(\frac{R_1 + R_2}{R_1}\right) \times \text{V\_IR1} \qquad \text{(Equation 3)}$$

Thus, the gain value can be regulated by changing the resistance values as shown in the above Equation 3. When the gain value is regulated by the resistance values, it is difficult to regulate the gain value for each brightness. Therefore, the embodiment applies the gain value differently for each brightness/gradation using the DAC. The error compensator 730 in FIG. 8A receives the first voltage value V_GAIN and the second voltage value V_ZERO output from the gain compensator 720 to generate the second voltage drop amount V_IR2 from which the zero gain error is removed.

Figure 13:
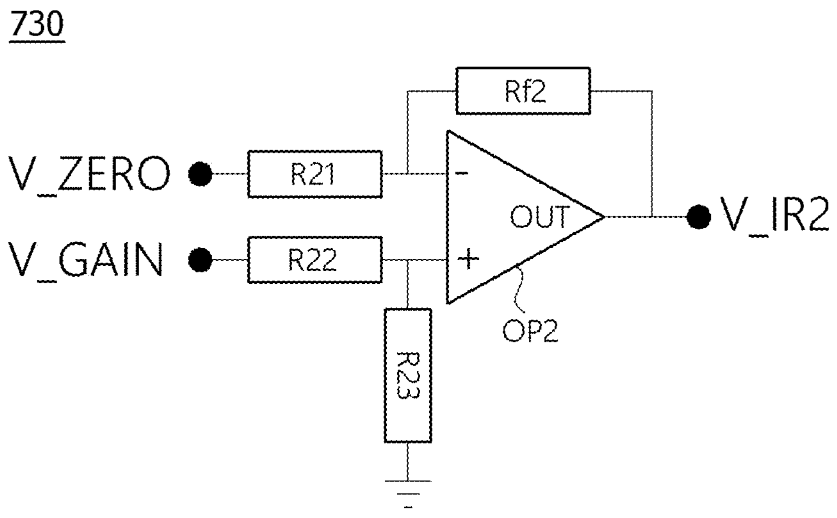
FIG. 13 is a diagram illustrating a configuration of an error compensator shown in FIGS. 9A and 9B.

FIG. 13 is a diagram illustrating a configuration of an error compensator 730 shown in FIG. 8A (see also FIG. 9A). Referring to FIG. 13, the error compensator 730 according to the embodiment can be implemented as a second differential amplifier. The second differential amplifier can include an operational amplifier OP2, a first resistor R21 connected to an inverting input terminal (−) of the operational amplifier and to which the second voltage value V_ZERO is applied, a second resistor R22 connected to a non-inverting input terminal (+) of the operational amplifier and to which the first voltage value V_GAIN is input, a third resistor R23 connected between the non-inverting input terminal (+) and a ground, and a feedback resistor Rf2 connected between an output terminal OUT and the inverting input terminal (−) of the operational amplifier. The second voltage drop amount V_IR2, which is the output voltage of the second differential amplifier, is expressed by Equation 4 below.

$$\text{V\_IR2} = \frac{R_{fz}}{R_{z1}} \times \text{V\_ZERO} + \left[1 + \frac{R_{fz}}{R_{z1}}\right]\left[\frac{R_{2s}}{R_{22} + R_{23}}\right] \times \text{V\_GAIN} \qquad \text{(Equation 4)}$$

In addition, the voltage compensator 740 can receive the second voltage drop amount V_IR2 output from the error compensator 730, the high potential reference voltage REF_H, and the low potential reference voltage REF_L to generate a compensation voltage value V_DR. Further, the compensation voltage value V_DR2 can include a first compensation voltage value V_DR1 generated by using the second voltage drop amount V_IR2 and the high potential reference voltage REF_H, and a second compensation voltage value V_DR2 generated by receiving the second voltage drop amount V_IR2 and the low potential reference voltage REF_L.

Also, the first and second compensation voltage values V_DR1 and V_DR2 can be used to regulate a high potential gamma reference voltage GMA_REF_H and a low potential gamma reference voltage GMA_REF_L of the gamma compensation voltage generator. For example, the high potential gamma reference voltage GMA_REF_H' is regulated to a value equal to the high potential gamma reference voltage GMA_REF_H minus the first compensation voltage value V_DR1, and the low potential gamma reference voltage GMA_REF_L' is regulated to a value equal to the low potential gamma reference voltage GMA_REF_L minus the second compensation voltage value V_DR2.

Figure 14:
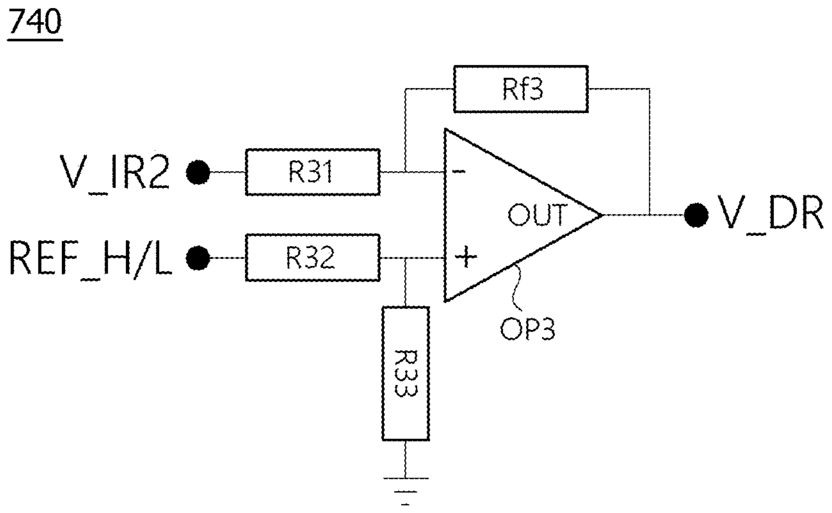
FIG. 14 is a diagram illustrating a configuration of a voltage compensator shown in FIGS. 9A and 9B.

FIG. 14 is a diagram illustrating a configuration of a voltage compensator 740 shown in FIG. 8A (see also FIG. 9A). Referring to FIG. 14, the voltage compensator 740 according to the embodiment can be implemented as a third differential amplifier. In particular, the third differential amplifier can include an operational amplifier OP3, a first resistor R31 connected to an inverting input terminal (−) of the operational amplifier and to which the second voltage drop amount V_IR2 is applied, a second resistor R32 connected to a non-inverting input terminal (+) of the operational amplifier and to which the high potential reference voltage REF_H or the low potential reference voltage REF_L (REF_H/L) is input, a third resistor R33 connected between the non-inverting input terminal (+) and a ground, and a feedback resistor Rf3 connected between an output terminal OUT and the inverting input terminal (−) of the operational amplifier.

Further, a compensation voltage value V_DR, which is an output voltage of the third differential amplifier, includes the first compensation voltage value V_DR1 and a second compensation voltage value V_DR2, each of which is expressed by Equation 5 and Equation 6 below.

$$\text{V\_DR1} = \frac{R_{fs}}{R_{31}} \times V \cdot IR2 + \left[1 + \frac{R_{f3}}{R_{31}}\right]\left[\frac{R_{33}}{R_{32} + R_{33}}\right] \times \text{REF\_H} \qquad \text{(Equation 5)}$$

$$\text{V\_DR2} = \frac{R_{fs}}{R_{31}} \times \text{V\_IR2} + \left[1 + \frac{R_{f3}}{R_{31}}\right]\left[\frac{R_{33}}{R_{32} + R_{33}}\right] \times \text{REF\_L} \qquad \text{(Equation 6)}$$

Here, V_DR1 is the compensation voltage value for REF_H, and V_DR2 is the compensation voltage value for REF_L.

Referring to FIGS. 8B and 9B, the compensation circuit 700-1 according to an embodiment of the present disclosure can include a voltage calculator 710-1, a gain compensator 720-1, and a voltage compensator 740-1. The compensation circuit 700-1 does not include an error compensator in the compensation circuit of FIG. 8A, but has the same configuration and functions as the voltage calculator, the gain compensator, and the voltage compensator, and thus their descriptions are omitted. For example, if the zero-scale-error of the DAC module including the error compensator of FIG. 8A is small enough to be ignored, the error compensator is not included.

Figure 15A:
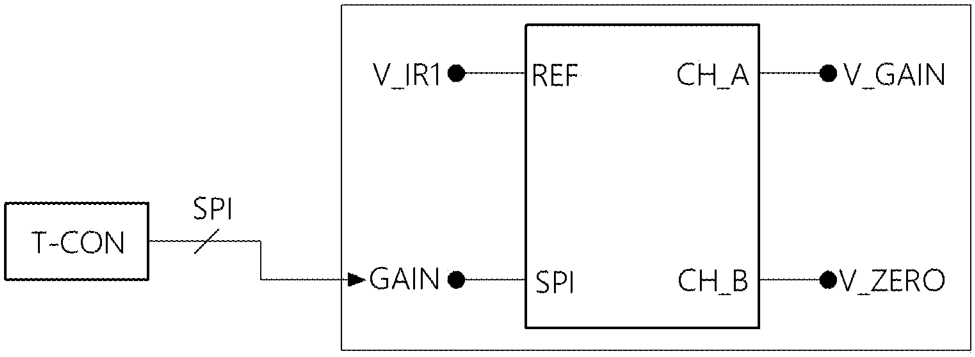
FIGS. 15A and 15B are diagrams illustrating a gain control operation of a gain compensator.
Figure 15B:
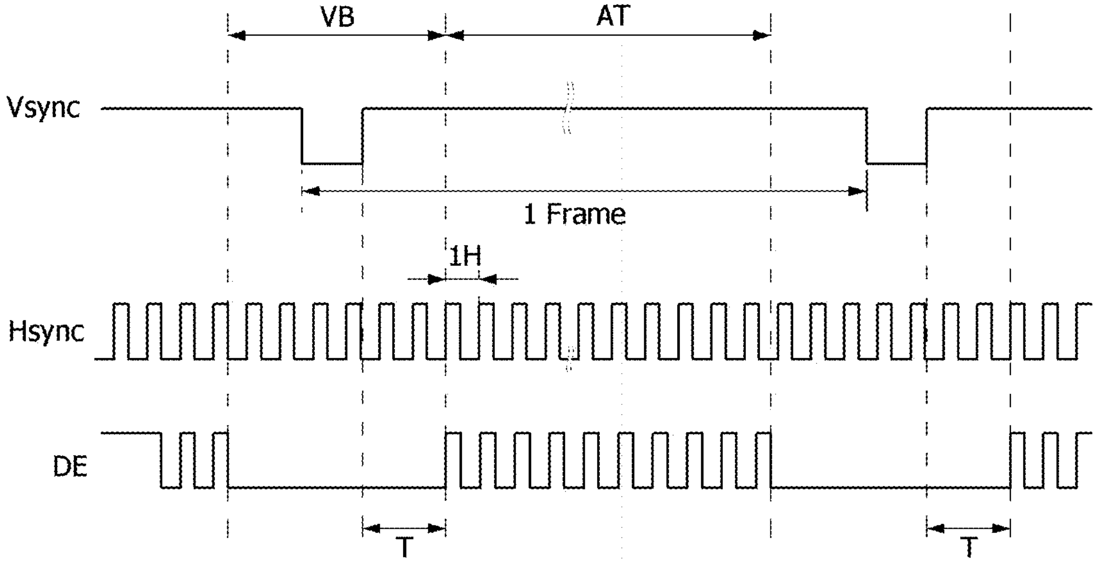

Next, FIGS. 15A and 15B are diagrams illustrating a gain control operation of a gain compensator. Referring to FIGS. 15A and 15B, the timing controller 500 can transmit and receive signals to and from the gain compensator according to a predetermined interface. Here, the interface can be, but is not limited to, a serial peripheral interface (SPI). When changing the gain value of the DAC module by changing the brightness value or the gradation value, the timing controller 500 can change the gain value of the DAC module before a data enable signal DE is applied after a vertical synchronization signal Vsync is applied during the vertical blank period VB.

Figure 16:
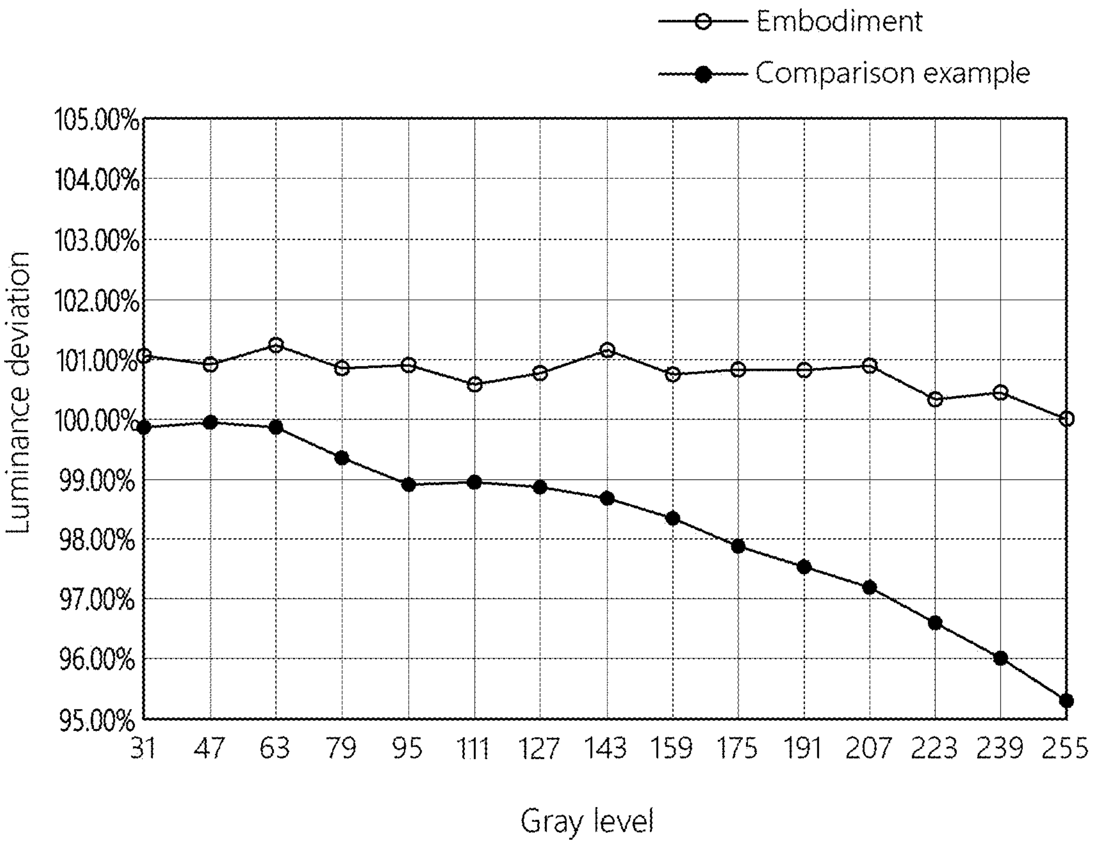
FIG. 16 is a diagram for comparing and explaining simulation results of the embodiment and a comparative Example.

Next, FIG. 16 is a diagram for comparing and explaining simulation results of the embodiment and a comparative example. In particular, FIG. 16 illustrates luminance deviations for each gray level between the embodiment and a comparison example. For the embodiment to which the gain value is applied, the luminance deviation for each gray level is within 1%, while for the comparison example to which the gain value is not applied, the luminance deviation for each gray level is by nearly 5%. Thus, when the gain value is applied as in the embodiment, the luminance deviation for each gray level is reduced.

Figure 17A:
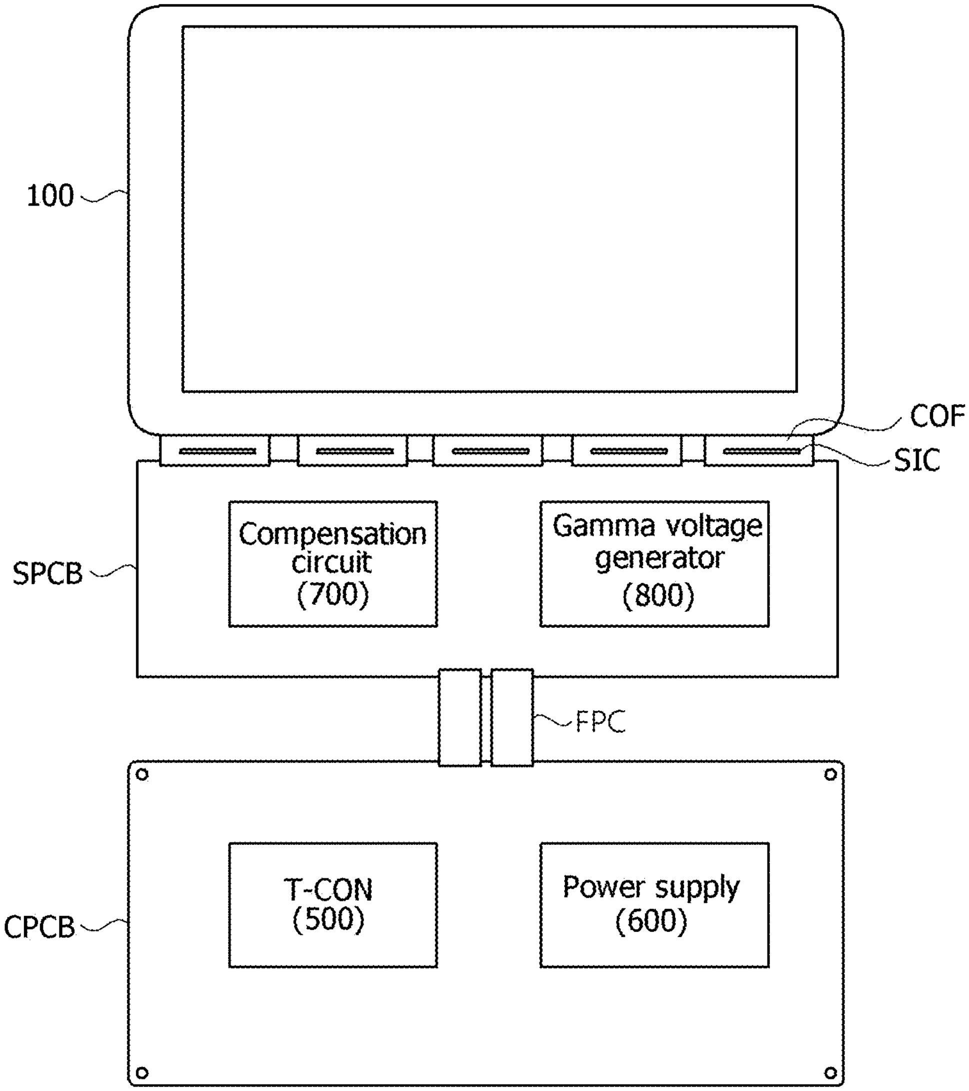
FIGS. 17A and 17B are diagrams illustrating an arrangement of a compensation circuit according to an embodiment.
Figure 17B:
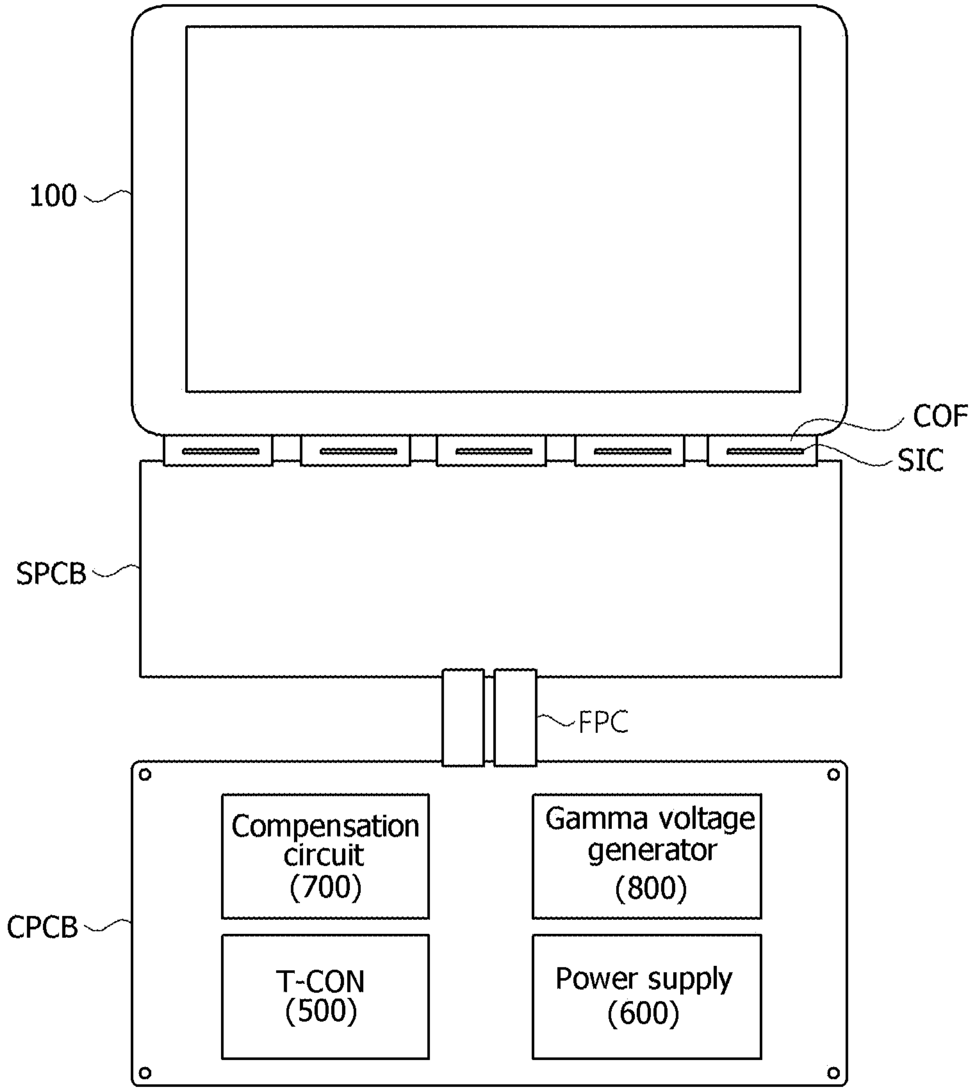

Next, FIGS. 17A and 17B are diagrams illustrating an arrangement of a compensation circuit according to an embodiment. Referring to FIG. 17A, a compensation circuit 700 and a gamma voltage generator 800 according to the embodiment can be mounted on a source printed circuit board SPCB. In addition, a timing controller 500 and a power supply 600 can be mounted on a control printed circuit board CPCB. The control printed circuit board CPCB can be connected to the source printed circuit board SPCB by a flexible circuit film, such as a flexible printed circuit FPC.

Referring to FIG. 17B, the compensation circuit 700, the gamma voltage generator 800, the timing controller 500 and the power supply 600 according to the embodiment can be mounted on a control printed circuit board CPCB. Further, a pixel driving voltage ELVDD output from the power supply 600 can be supplied to the display panel 100 via the flexible printed circuit FPC, the source printed circuit board SPCB, and a chip on film COF. Also, a voltage wire on the display panel 100 can be connected to the power supply 600 via the chip on film COF, the source printed circuit board SPCB, and the flexible printed circuit FPC.

Figure 18:
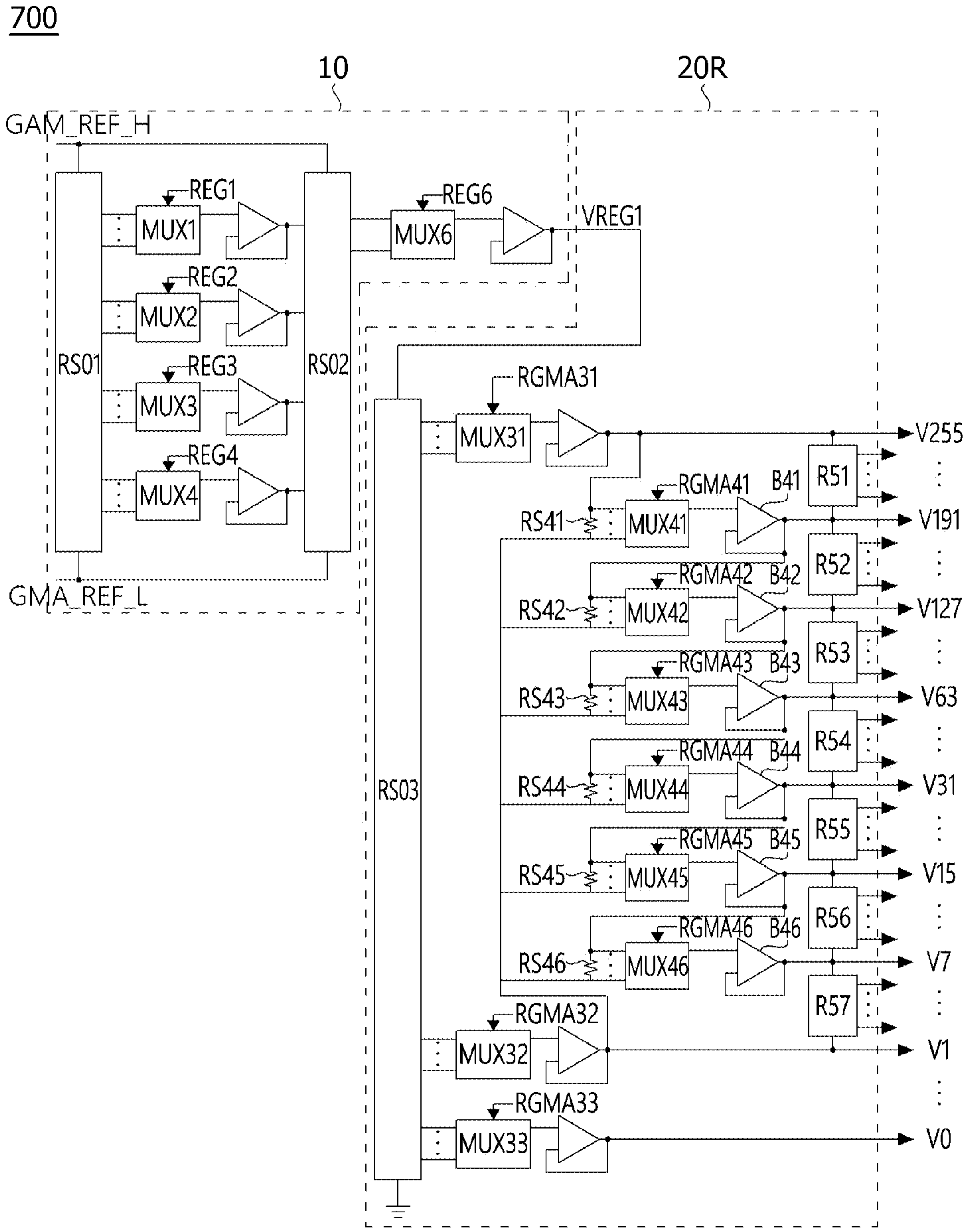
FIG. 18 is a circuit diagram illustrating an example of a gamma compensation voltage generator shown in FIG. 6.

Next, FIG. 18 is a circuit diagram illustrating an example of a gamma compensation voltage generator shown in FIG. 6. Referring to FIG. 18, a gamma voltage generator 800 includes a first divider circuit RS01, a first voltage selector, a second divider circuit RS02, a second voltage selector, a third divider circuit RS03, a third voltage selector, fourth voltage divider circuits R41 to R46, a fourth voltage selector, and fifth divider circuits R51 to R57.

The first voltage divider circuit RS01 distributes a high-potential gamma reference voltage GMA_REF_H using resistors connected in series between the high-potential gamma reference voltage GMA_REF_H and a low-potential gamma reference voltage GMA_REF_L to output voltages having different voltage levels. In addition, the first voltage selector selects the voltage output from the first voltage divider circuit RS01. The first voltage selector includes first to fourth multiplexers MUX1 to MUX4 connected between the first divider circuit RS01 and the second divider circuit RS02 to supply the voltage selected from the first divider circuit RS01 to the second divider circuit RS02. Further, the first to fourth multiplexers MUX1 to MUX4 output voltages that are lower than the high-potential gamma reference voltage GMA_REF_H and have different voltage levels, which are supplied to nodes of the second voltage divider circuit RS02. Also, the voltages output from each of the first to fourth multiplexers MUX1 to MUX4 are directly applied through a buffer to nodes spaced at regular intervals in the second voltage divider circuit RS02. The first to fourth multiplexers MUX1 to MUX4 can also adjust voltages set according to register settings REG1 to REG4.

In addition, the register settings REG1 to REG4, RGMA31 to RGMA33, and RGMA41 to RGMA46 can be stored in a first memory prior to shipping of the product and then transferred to a second memory when an electroluminescent display device is powered on, or can be stored in the second memory prior to shipping of the product. The register settings REG1 to REG4 are register setting values for adjusting luminance during optical compensation or in conjunction with a display brightness value (DBV). Further, the DBV can be varied in response to an illuminance sensor output signal from a host system or a luminance input value from a user.

In addition, the second voltage divider circuit RS02 includes resistors connected in series between a node to which the high-potential gamma reference voltage GMA_REF_H is applied and a node to which the low-potential gamma reference voltage GMA_REF_L is applied. The second voltage divider circuit RS02 also divides the high-potential gamma reference voltage GMA_REF_H and outputs voltages of different voltage levels through the nodes between the resistors.

Further, the second voltage selector can include a multiplexer MUX6 that selects a first reference voltage VREG1 by selecting one of the nodes of the second voltage divider circuit RS02 according to a register setting REG6. The output voltage of the multiplexer MUX6 can be varied depending on the register setting REG6. In addition, a reference voltage VREG1 output from the multiplexer MUX6 is supplied through a buffer to a third voltage divider circuit RS03. The third voltage divider circuit RS03 also divides the reference voltage VREG1 using resistors connected in series between the reference voltage VREG1 and a base voltage GND to output voltages having different voltage levels.

In addition, third voltage selector includes a third-first multiplexer MUX31 that selects any one of high potential nodes of the third voltage divider circuit RS03 according to a register setting RGMA31 and outputs a high potential gamma reference voltage from the selected node as the highest gamma compensation voltage V255, a third-second multiplexer MUX32 that selects any one of low potential nodes of a first group in the third voltage divider circuit RS03 according to a register setting RGMA32 and outputs a low potential voltage from the selected node as a seventh gamma tap voltage V1, and a third-third multiplexer MUX33 that selects any one of low potential nodes of a second group in the third voltage divider circuit RS03 according to a register setting RGMA33 and outputs the lowest gamma compensation voltage V0 from the selected node.

Further, the fourth voltage divider circuits R41 to R46 include fourth-first to fourth-sixth voltage divider circuits R41 to R46 that divide voltages between the highest gamma compensation voltage V255 and the seventh gamma tap voltage V1 to output gamma compensation voltages for each gray level. Also, the fourth voltage selector includes fourth-first to fourth-sixth voltage selectors that output the first to sixth gamma tap voltages V191, V127, V63, V31, V15, V7 using multiplexers MUX41 to MUX46. The first to sixth gamma tap voltages V191, V127, V63, V31, V15, V7 are lower than the highest gamma compensation voltage V255 and higher than the lowest gamma tap voltage V1.

In addition, the fourth-first voltage divider circuit R41 divides the highest gamma compensation voltage V255 using resistors connected in series between the highest gamma compensation voltage V255 and the seventh gamma tap voltage V1. The fourth-first voltage selector includes a fourth-first multiplexer MUX41 that selects one of the nodes of the fourth-first voltage divider circuit R41. Also, the fourth-first multiplexer MUX41 selects one of the nodes of the fourth-first voltage divider circuit R41 depending on the register setting RGMA41 to output the voltage from the selected node.

Further, the output voltage of the fourth-first multiplexer MUX41 is output as the first gamma tap voltage V191 via the buffer B41. The first gamma tap voltage V191 is a gamma compensation voltage corresponding to a grayscale value 191 of the pixel data RGB. The fourth-second voltage divider circuit R42 divides the first gamma tap voltage V191 using resistors connected in series between the first gamma tap voltage V191 and the seventh gamma tap voltage V1. In addition, fourth-second multiplexer MUX42 selects one of the nodes of the fourth-second voltage divider circuit R42 depending on the register setting RGMA42 to output the voltage from the selected node. The output voltage of the fourth-second multiplexer MUX42 is output as the second gamma tap voltage V127 via the buffer B42. The second gamma tap voltage V127 is a gamma compensation voltage corresponding to the grayscale value 127 of the pixel data RGB.

Further, the fourth-sixth voltage divider circuit R46 divides the fifth gamma tap voltage V15 using resistors connected in series between the fifth gamma tap voltage V15 and the seventh gamma tap voltage V1. In addition, fourth-sixth multiplexer MUX46 selects one of the nodes of the fourth-sixth voltage divider circuit R46 depending on the register setting RGMA46 to output the voltage from the selected node. The output voltage of the fourth-sixth multiplexer MUX46 is output as the sixth gamma tap voltage V7 via the buffer B46, and the sixth gamma tap voltage V7 is a gamma compensation voltage corresponding to the grayscale value 7 of the pixel data RGB.

In addition, the fifth voltage divider circuit R51 to R57 uses the resistors connected in series between the highest gamma compensation voltage V255 and the seventh gamma tap voltage V1 to distribute the highest gamma compensation voltage V255 so that the gamma compensation voltages V1 to V255 are output for each gray level having different voltage levels. The fifth-first voltage divider circuit R51 uses resistors connected in series between the highest gamma compensation voltage V255 and the first gamma tap voltage V191 so that the gamma compensation voltages are output for each gray level between the highest gamma compensation voltage V255 and the first gamma tap voltage V191. The fifth-second voltage divider circuit R52 uses resistors connected in series between the first gamma tap voltage V191 and the second gamma tap voltage V127 so that the gamma compensation voltages are output for each gray level between the first gamma tap voltage V191 and the second gamma tap voltage V127. Further, fifth-sixth voltage divider circuit R56 uses resistors connected in series between the fifth gamma tap voltage V15 and the sixth gamma tap voltage V7 so that the gamma compensation voltages are output for each gray level between the fifth gamma tap voltage V15 and the sixth gamma tap voltage V7. The fifth-seventh voltage divider circuit R57 uses resistors connected in series between the sixth gamma tap voltage V7 and the seventh gamma tap voltage V1 so that the gamma compensation voltages are output for each gray level between the sixth gamma tap voltage V7 and the seventh gamma tap voltage V1. The gamma compensation voltages V0 to V255 are supplied to the DAC of the data driver 110.

In addition, gamma compensation voltage of the data voltage can be implemented as positive gamma or negative gamma depending on the pixel circuit structure. For example, when a light-emitting device of pixels, such as a transistor driving an OLED, is implemented as an n-channel MOSFET and a data voltage is applied to the gate of the transistor, a gamma compensation voltage with a positive gamma is generated, and the higher the gray level of the pixel data (RGB), the higher the gamma compensation voltage.

FIG. 18 illustrates a gamma voltage generator set to a positive gamma. When a light-emitting device of pixels is implemented as a p-channel MOSFET and a data voltage is applied to the gate of the transistor, a gamma compensation voltage with a negative gamma is generated, and the higher the gray level of the pixel data (RGB), the lower the gamma compensation voltage. In this instance, in FIG. 18, the voltage levels of GMA_REF_H and GMA_REF_L are changed to each other, and the voltage levels of VREG1 and VREG2 are also changed to each other.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A compensation circuit comprising:

a voltage calculator configured to generate a pixel driving voltage drop amount using a pixel driving voltage applied from a power supply and a pixel driving voltage fed back directly from a midpoint of a first voltage wire, the midpoint being physically equidistant from upper and lower ends of the first voltage wire;

a gain compensator configured to amplify the generated pixel driving voltage drop amount using a predetermined gain value; and a voltage compensator configured to generate a compensation voltage value for compensating a gamma reference voltage for a corresponding pixel using the amplified pixel driving voltage drop amount, wherein the first voltage wire is formed to extend continuously and entirely within a non-active area on a side of a display panel and is separated from pixel lines disposed in an active area of the display panel, and wherein a plurality of second voltage wires branch from the first voltage wire into the active area to sense the pixel driving voltage from the pixel lines.

2. The compensation circuit of claim 1, wherein the voltage calculator is arranged side by side with a longer side of the display panel, and is configured to receive the pixel driving voltage fed back from the midpoint of the first voltage wire configured to sense the pixel driving voltage from each pixel line in the display panel.

3. The compensation circuit of claim 1, wherein the voltage compensator is configured to generate the compensation voltage value for compensating for the gamma reference voltage using the amplified pixel driving voltage drop amount and a gamma reference voltage.

4. The compensation circuit of claim 1, wherein the predetermined gain value is applied from a timing controller or a host system.

5. The compensation circuit of claim 1, wherein the predetermined gain value is varied depending on a gray level value or a display brightness value (DBV) of the corresponding pixel.

6. The compensation circuit of claim 1, wherein the gain compensator includes a digital analog converter (DAC) module, and wherein the DAC module includes:

a first input terminal configured to receive the pixel driving voltage drop amount;

a second input terminal configured to receive the predetermined gain value; and a first output terminal configured to amplify the pixel driving voltage drop amount received from the first input terminal using the predetermined gain value received from the second input terminal and to output the amplified pixel driving voltage drop amount.

7. The compensation circuit of claim 6, wherein the DAC module further comprises:

a second output terminal configured to output an offset value for a value output from the first output terminal when a value input to the first input terminal is 0.

8. The compensation circuit of claim 7, further comprising:

an error compensator configured to receive the amplified pixel driving voltage drop amount and the offset value and to generate a voltage drop amount in which a zero gain error is removed, wherein the voltage compensator generates the compensation voltage value for compensating the gamma reference voltage using the voltage drop amount in which a zero gain error is removed and generated from the error compensator.

9. A display device comprising:

a display panel including data lines, gate lines, and pixels applied with pixel driving voltages;

a data driver configured to supply pixel data to the data lines;

a power supply configured to apply the pixel driving voltage to the pixels; and a compensation circuit configured to:

generate a pixel driving voltage drop amount using a pixel driving voltage applied from the power supply and a pixel driving voltage fed back directly from a midpoint of a first voltage wire, the midpoint being physically equidistant from upper and lower ends of the first voltage wire, amplify the generated pixel driving voltage drop amount using a predetermined gain value, and generate a compensation voltage value for compensating a gamma reference voltage for a corresponding pixel using the amplified pixel driving voltage drop amount, wherein the first voltage wire is formed to extend continuously and entirely within a non-active area on a side of the display panel and is separated from pixel lines disposed in an active area of the display panel, and wherein a plurality of second voltage wires branch from the first voltage wire into the active area to sense the pixel driving voltage from the pixel lines.

10. The display device of claim 9, wherein the data driver includes a first data driver disposed at an upper end of the display panel and a second data driver disposed at a lower end of the display panel, wherein a pair of data lines is connected to the first data driver and the second data driver for each column line, wherein an odd-numbered data line is connected to pixels arranged on an odd-numbered pixel line, and wherein an even-numbered data line is connected to pixels arranged on an even-numbered pixel line.

11. The display device of claim 9, wherein the first voltage wire is arranged side by side with a longer side of the display panel.

12. The display device of claim 9, wherein the compensation circuit includes:

a voltage calculator configured to generate the pixel driving voltage drop amount using the pixel driving voltage applied from the power supply and the pixel driving voltage fed back from the midpoint of the first voltage wire; and a voltage compensator configured to generate the compensation voltage value for compensating the gamma reference voltage for the corresponding pixel using the amplified pixel driving voltage drop amount.

13. The display device of claim 12, wherein the compensation circuit further includes:

a gain compensator configured to amplify the generated pixel driving voltage drop amount using the predetermined gain value.

14. The display device of claim 13, wherein the gain compensator includes a digital analog converter (DAC) module, and wherein the DAC module includes:

a first input terminal configured to receive the pixel driving voltage drop amount;

a second input terminal configured to receive the predetermined gain value; and a first output terminal configured to amplify the pixel driving voltage drop amount received from the first input terminal using the predetermined gain value received from the second input terminal and to output the amplified pixel driving voltage drop amount.

15. The display device of claim 14, wherein the DAC module further comprises:

a second output terminal configured to output an offset value for a value output from the first output terminal when a value input to the first input terminal is 0.

16. The display device of claim 15, wherein the compensation circuit further includes:

an error compensator configured to receive the amplified pixel driving voltage drop amount and the offset value to generate a voltage drop amount in which a zero gain error is removed, and wherein the voltage compensator generates the compensation voltage value for compensating the gamma reference voltage using the amplified pixel driving voltage drop amount in which a zero gain error is removed and generated from the error compensator.

17. The display device of claim 9, wherein the predetermined gain value is applied from a timing controller or a host system.

18. The display device of claim 9, wherein the predetermined gain value varies depending on a grayscale value or a display brightness value (DBV) of the corresponding pixel.

19. The display device of claim 9, further comprising:

a gamma voltage generator configured to adjust the gamma reference voltage using the amplified pixel driving voltage drop amount and generate a gamma voltage for each gray level using the adjusted gamma reference voltage.

20. The display device of claim 19, wherein the gamma voltage generator includes a gamma reference voltage regulator and a gamma compensation voltage generator, wherein the gamma reference voltage regulator uses the amplified pixel driving voltage drop amount to adjust the gamma reference voltage including a high potential gamma reference voltage and a low potential gamma reference voltage, and wherein the gamma compensation voltage generator generates a gamma compensation voltage for each gray level using the adjusted high potential gamma reference voltage and the adjusted low potential gamma reference voltage.

21. The display device of claim 9, wherein the first voltage wire formed in the non-active area is formed with a wider width than voltage wires formed in the active area of the display panel.

* * * * *